United States Patent [19]

Kusaka

[11] Patent Number: 5,539,493
[45] Date of Patent: Jul. 23, 1996

[54] AUTOFOCUS CAMERA

[75] Inventor: Yosuke Kusaka, Yokohama, Japan

[73] Assignee: Nikon Corporation, Tokyo, Japan

[21] Appl. No.: 166,936

[22] Filed: Dec. 15, 1993

[30] Foreign Application Priority Data

Dec. 15, 1992 [JP] Japan .................................. 4-334743
Mar. 12, 1993 [JP] Japan .................................. 5-052635
Mar. 23, 1993 [JP] Japan .................................. 5-064116

[51] Int. Cl.⁶ ................................................. G03B 13/36
[52] U.S. Cl. ............................................... 354/402
[58] Field of Search .................................. 354/402, 406, 354/407, 408

[56] References Cited

U.S. PATENT DOCUMENTS 4,831,403 5/1989 Ishida et al. ............................ 354/402
5,126,777 6/1992 Akashi et al. .......................... 354/402

FOREIGN PATENT DOCUMENTS 2-64517 3/1990 Japan .

Primary Examiner—W. B. Perkey

[57] ABSTRACT

A camera has a first sensor for receiving an object image formed by a focus detection optical system, and a second sensor having a higher sensitivity than that of the first sensor. During a continuous shooting operation of a continuous shooting unit, a control unit preferentially operates the second sensor, a focus detection calculation unit calculates a defocus amount of a taking optical system on the basis of the output from the second sensor, and a drive unit drives an optical element in accordance with the calculated defocus amount to attain an in-focus state of the taking optical system.

29 Claims, 24 Drawing Sheets

AUTOFOCUS CAMERA

BACKGROUND OF THE INVENTION

1. Field of the Invention

The present invention relates to an autofocus camera.

2. Related Background Art

As is well known, an autofocus camera receives an object image formed by a focus detection optical system using a charge accumulation type sensor, detects a defocus amount of the object image surface with respect to a prospective focal plane of a taking optical system by calculating the sensor output, and drives a focusing lens in accordance with the detected defocus amount, thereby achieving an in-focus state of the taking optical system.

When an autofocus (to be abbreviated as AF hereinafter) camera of this type executes a continuous shooting operation, if the charge accumulation time of the charge accumulation type sensor between each two adjacent frames is prolonged, a high-speed continuous shooting operation is disabled. For this reason, a technique for shortening the accumulation time by increasing the amplification gain of the sensor output in the continuous shooting mode is disclosed in Japanese Laid-Open Patent Application No. 2-64517.

However, when the accumulation time is shortened by merely increasing the amplification gain of the sensor output, since the charge accumulation amount itself before amplification decreases, the (S/N) sitnal-to-ratio of the sensor output consequently decreases, and detection precision of the defocus amount deteriorates. When a continuous shooting operation is executed while executing AF control in accordance with this defocus amount, photographs in an out-of-focus state are often obtained.

Also, a multi AF area AF camera is known. This camera comprises a plurality of sets of focus detection optical systems and sensors, detects a plurality of defocus amounts by executing focus detection for a plurality of areas set on a taking field, determines a single final defocus amount based on these defocus amounts, and drives a focusing lens in accordance with the final defocus amount, thereby achieving an in-focus state of a taking optical system.

However, in the above-mentioned multi AF area AF camera, a time required for AF control (to be referred to as an AF time hereinafter), including the charge accumulation time, the charge transfer time, and the focus detection time of the sensors, increases since the number of AF areas increases, as compared to a single AF area AF camera which performs focus detection using a single area, resulting in a long focusing response time.

In particular, when a continuous shooting operation is performed using the multi AF area AF camera, the AF time between each two adjacent frames increases, and the frame speed cannot be increased.

FIG. 23 is a timing chart of an AF sequence for explaining the above-mentioned problem. For the sake of easy understanding, assuming that focus detection is performed while operating first and second sensors corresponding to two AF areas, an AF time Ta is given by:

$$Ta = MAX(I1, I2) + F1 + F2 + A1 + A2 + L, \quad (1)$$

where I1 and I2 are the charge accumulation times of the first and second sensors, F1 and F2 are the output transfer times of the first and second sensors, A1 and A2 are the output calculation times of the first and second sensors, and L is the lens drive time.

Furthermore, the following drive system (to be referred to as a predictive drive system hereinafter) is known. That is, whether or not an object is moving is discriminated on the basis of a plurality of defocus amounts which are time-serially generated, and when it is determined that the object is moving, a lens is driven by correcting a normal lens drive amount, thereby following the moving object and maintaining an in-focus state.

The basic principle of object movement discrimination in the above-mentioned predictive drive system will be described below with reference to FIG. 35.

Referring to FIG. 35, the position of the image plane is plotted along the ordinate, and the time is plotted along the abscissa. A solid curve represents the locus of the object image surface when a taking optical system is ideally driven to follow a moving object, and a broken curve represents the position of the image surface corresponding to an actual lens position. Therefore, the difference between the solid curve and the broken curve represents the difference between the positions of the image surface=the defocus amount. If the defocus amount at time t1 is represented by d1, the defocus amount at time t2 is represented by d2, the image surface moving amount upon lens drive control between times t1 and t2 is represented by L12, and a moving speed v12 of the image surface upon object movement is given by:

$$v12 = (d2 + L12 - d1)/(t2 - t1). \quad (2)$$

When the absolute value of the image surface moving speed v12 is equal to or larger than a predetermined value, it can be determined that an object is moving.

When it is determined that the object is moving, lens drive control can be executed in consideration of movement of the image surface upon object movement, so that the solid curve and the broken curve coincide with each other at time t3, and the defocus amount becomes zero.

The lens drive amount at this time can be determined in correspondence with a corrected defocus amount d2' obtained by correcting the defocus amount d2 in accordance with the following equation (3):

$$d2' = d2 + v12 \times (t3 - t2). \quad (3)$$

In the above-mentioned system, since the moving speed of the object image surface is calculated from the defocus amounts between two times, the response time to a change in moving speed of the image surface is determined depending on the interval between times at which the defocus amounts are detected. Therefore, in order to perform precise predictive drive control, the above-mentioned interval is preferably set to be sufficiently short.

However, when the luminance of an object is low, since the received light amount of the charge accumulation type sensor decreases, and the charge accumulation time is prolonged, the detection interval of the defocus amounts is also prolonged. For this reason, when the object speed suddenly changes, it is impossible to measure a correct image surface moving speed, resulting in over-running of the lens by the predictive drive system.

Also, a multi AF area AF camera is known. This camera comprises a plurality of sets of focus detection optical systems and sensors, detects a plurality of defocus amounts by executing focus detection for a plurality of focus detection areas set on a taking field, determines a single final defocus amount based on these defocus amounts, and drives a focusing lens in accordance with the final defocus amount, thereby achieving an in-focus state of a taking optical system.

However, in the above-mentioned multi AF area AF camera, a time required for AF control (to be referred to as an AF time hereinafter) including the charge accumulation time, the charge transfer time, and the focus detection time of the sensors increases since the number of focus detection areas increases, as compared to a camera which adopts a single AF area system, i.e., performs a focusing operation on the basis of the defocus amount on a single focus detection area, thus prolonging the detection interval of the defocus amount. Therefore, for the same reason as in a low-luminance state, when the object speed suddenly changes, a correct image surface moving speed cannot be measured, resulting in over-running of the lens by the predictive drive system.

SUMMARY OF THE INVENTION

It is an object of the present invention to provide an AF camera which allows a high-speed continuous shooting operation while maintaining high focusing precision.

In order to achieve the above object, an AF camera according to the first aspect of the present invention comprises: a taking optical system including an optical element which is movable in an optical axis direction so as to form an object image on a prospective focal plane; a focus detection optical system; a first sensor for receiving an object image formed by the focus detection optical system, a second sensor having a higher sensitivity than a sensitivity of the first sensor; a focus detection calculation unit for calculating a defocus amount of an image surface of the taking optical system with respect to the prospective focal plane on the basis of the output from the first or second sensor; a drive unit for driving the optical element in accordance with the defocus amount calculated by the focus detection calculation unit to achieve an in-focus state of the taking optical system; continuous shooting unit means for performing a continuous shooting operation; and control unit for preferentially operating the second sensor during the continuous shooting operation by the continuous shooting unit.

In this manner, the sensor having a relatively high sensitivity of a plurality of sensors is preferentially operated during the continuous photographing operation, thereby shortening the focusing time.

The first and second sensors may adopt the following arrangement. That is, when the first and second sensors comprise charge accumulation type sensors, and perform charge accumulation for an object of a given luminance for the same period of time, the charge accumulation amount of the second sensor becomes larger than that of the first sensor.

In another arrangement, the first and second sensors may have different pixel areas.

Also, the focus detection optical system may comprise a first focus detection optical system for forming an object image on the first sensor, and a second focus detection optical system, having different optical characteristics from those of the first focus detection optical system, for forming an object image on the second sensor.

It is another object of the present invention to provide a multi AF area AF camera which allows a high-speed continuous shooting operation.

Referring to FIG. 14, a second aspect of the present invention is applied to an AF camera comprising: a taking optical system 902 for forming an object image on a taking field 901 set on a prospective focal plane; a plurality of photoelectric conversion unit 904a and 904b arranged in correspondence with a plurality of focus detection areas 903a and 903b set in the taking field 901; a focus detection optical system 905 for forming an object image by guiding light beams passing through the focus detection areas 903a and 903b to the corresponding photoelectric conversion unit 904a and 904b; a focus detection unit 906 for calculating a defocus amount of the imaging plane of the taking optical system 902 with respect to the prospective focal plane on the basis of the outputs from the plurality of photoelectric conversion unit 904a and 904b; and drive unit 907 for driving the taking optical system 902 in accordance with the defocus amount calculated by the focus detection unit 906. In order to achieve the above object, the camera of the present invention comprises: a continuous shooting unit 908 for performing a continuous shooting operation; and a control unit 909 for, when the continuous shooting operation is performed by the continuous shooting unit, controlling the focus detection unit 906 to calculate the defocus amount on the basis of an output from the photoelectric conversion portion corresponding to a predetermined one of the plurality of focus detection areas 903a and 903b, and for, when the continuous shooting operation is not performed, controlling the focus detection unit 906 to calculate the defocus amount on the basis of the outputs from the photoelectric conversion unit 904a and 904b corresponding to all the focus detection areas 903a and 903b.

The plurality of photoelectric conversion portion may be of a charge accumulation type.

One of the plurality of focus detection areas may be set at the center of the taking field, and the control unit may control the focus detection unit to calculate the defocus amount on the basis of the output from the photoelectric conversion portion corresponding to the focus detection area at the center of the taking field in the continuous shooting mode.

At least two of the plurality of focus detection areas may be elongated and have different orientations in the taking field. In the continuous shooting mode, the control unit may control the focus detection unit to calculate the defocus amount on the basis of the output from the photoelectric conversion portion corresponding to the focus detection area having a specific orientation in the taking field.

The camera may comprise a setting member 910 for arbitrarily setting a focus detection area from the plurality of focus detection areas in the continuous shooting mode, and the control means 909 may control the focus detection unit 906 to calculate the defocus amount on the basis of the output from the photoelectric conversion portion corresponding to the focus detection area set by the setting member 910 in the continuous shooting mode.

According to the present invention, in the continuous shooting mode of the multi AF area camera using a plurality of sensors, the AF time between each two adjacent frames is shortened by using a predetermined sensor, and the position of the sensor to be used is optimized so as not to lose track of an object using a small number of sensors.

FIG. 22 is a timing chart of an AF sequence for explaining the above-mentioned countermeasure. For the sake of easy understanding, assuming that focus detection is performed by operating only a second sensor of the first and second sensors corresponding to two AF areas, an AF time Ta is given by:

$$Ta = I2 + F2 + A2 + L. \tag{4}$$

More specifically, as can be seen from a comparison with equation (1), the AF time is shortened to almost ½ except for the accumulation times (I1 and I2).

It is still another object of the present invention to provide an AF camera which allows precise predictive drive control even in a low-luminance state.

It is still another object of the present invention to improve precision of predictive drive control in an AF camera having a plurality of focus detection areas.

The third aspect of the present invention is applied to an AF camera comprising: a taking optical system for forming an object image on a prospective focal plane; a focus detection optical system for detecting a focusing state of the taking optical system; a light-receiving unit for receiving an object image formed by the focus detection optical system; a focus detection calculation unit for calculating a defocus amount of an image surface of the taking optical system with respect to the prospective focal plane on the basis of an output from the light-receiving unit; an object movement discrimination unit for discriminating, based on a plurality of defocus amounts time-serially calculated by the focus detection calculation, unit whether or not an object is moving; and a focusing control unit for adjusting the focal point position of the taking optical system on the basis of the defocus amount, and for, when it is determined that the object is moving, correcting the adjustment amount of the focal point position of the taking optical system so as to decrease a focusing error caused by object movement. In order to achieve the above objects, the light-receiving unit comprises a first sensor and a second sensor which has a higher detection sensitivity than that of the first sensor and is juxtaposed to the first sensor, and a light-receiving control unit for, when the object movement discrimination unit determines that the object is moving, selecting the output from the second sensor as the output from the light-receiving unit.

In this camera, when the object movement discrimination unit determines that an object is moving, the output from the second sensor is selected as the output from the light-receiving unit. Since the second sensor has a high detection sensitivity of an object image, it can quickly detect an object image even in a low-luminance state.

In order to vary the detection sensitivity levels of an object image of the first and second sensors, for example, the first and second sensors adopt charge accumulation type sensors for accumulating a charge in accordance with the received light amount, and the charge accumulation amount of the second sensor obtained when an object image of a given luminance is received for a predetermined period of time is set to be larger than that of the first sensor. In this case, the pixel area of the second sensor may be set to be larger than that of the first sensor.

Alternatively, as shown in FIG. 28A, the focus detection optical system may comprise a first focus detection optical system for forming an object image on the first sensor, and a second focus detection optical system for forming an object image on the second sensor, and the pixel area of the second sensor obtained when the first and second sensors are projected onto a single plane on the object space side of the first and second focus detection optical systems may be set to be larger than that of the first sensor.

In the above-mentioned camera, when the object movement discrimination unit determines that an object is moving, and the luminance of an object image is equal to or lower than a predetermined value, the light-receiving control unit may select the output from the second sensor as the output from the light-receiving unit.

A modification of the third aspect of the present invention is applied to an AF camera comprising: a taking optical system for forming an object image on a prospective focal plane; a focus detection optical system for detecting a focusing state of the taking optical system; a light-receiving unit for receiving an object image formed by the focus detection optical system; a focus detection calculation means for calculating a defocus amount of an image surface of the taking optical system with respect to the prospective focal plane on the basis of an output from the light-receiving unit; or object movement discrimination unit for discriminating, based on a plurality of defocus amounts time-serially calculated by the focus detection calculation unit whether or not an object is moving; and a focusing control unit for adjusting the focal point position of the taking optical system on the basis of the defocus amount, and for, when it is determined that the object is moving, correcting the adjustment amount of the focal point position of the taking optical system so as to decrease a focusing error caused by object movement. In order to achieve the above objects, the light-receiving unit comprises a sensitivity switching unit capable of switching detection sensitivity of an object image of the light-receiving unit between at least two levels, i.e., high and low levels, and sensitivity control unit for, when the object movement discrimination unit determines that an object is moving, controlling the sensitivity switching means to select the high detection sensitivity level of the light-receiving unit.

In this case, the sensitivity control unit may be arranged to control the sensitivity switching unit to select the high detection sensitivity level of the light-receiving unit when the object movement discrimination unit determines that an object is moving, and the luminance of an object image is equal to or lower than a predetermined value.

In this camera, when the object movement discrimination unit determines that an object is moving, the object image detection sensitivity of the light-receiving unit is switched to the high level by the sensitivity switching unit, so that an object image can be quickly detected even in a low-luminance state.

Another modification of the third aspect of the present invention is applied to an AF camera comprising: a taking optical system for forming an object image on a prospective focal plane; a focus detection optical system for detecting focusing states of the taking optical system on a plurality of focus detection areas set in a taking field; a light-receiving unit comprising a plurality of sensors for receiving a plurality of object images formed by the focus detection optical system in units of focus detection areas; a focus detection calculation unit for calculating a defocus amount of an image surface of the taking optical system with respect to the prospective focal plane on the basis of an output from the light-receiving unit; an object movement discrimination unit for discriminating, based on a plurality of defocus amounts time-serially calculated by the focus detection calculation unit whether or not an object is moving; and a focusing control unit for adjusting the focal point position of the taking optical system on the basis of the defocus amount, and for, when it is determined that the object is moving, correcting the adjustment amount of the focal point position of the taking optical system so as to decrease a focusing error caused by object movement.

In order to achieve the above-mentioned objects, the camera further comprises a focus detection area selection unit for, when the object movement discrimination unit determines that an object is moving, selecting, as an output from the light-receiving unit, an output from the sensor corresponding to a specific focus detection area of the plurality of sensors of the light-receiving unit.

In this AF camera as well, the plurality of sensors may comprise charge accumulation type sensors for accumulating a charge in accordance with the received light amount.

The focus detraction area selection unit selects, e.g., the output from the sensor corresponding to the focus detection area from an object image of which the object movement discrimination unit has discriminated that an object is moving, as the output from the light-receiving unit.

The plurality of focus detection unit may partially overlap each other in the taking field of the taking optical system, and may extend in different directions. In this case, the focus detection area selection unit may select the output from the sensor corresponding to a high-luminance one of the plurality of the focus detection areas as the output from the light-receiving unit.

In this camera, when the object movement discrimination unit determines that an object is moving, only the output from a specific one of the plurality of sensors of the light-receiving unit is selected as the output from the light-receiving unit. Thus, the data amount from the light-receiving unit decreases, and the time required for calculation processing is shortened.

BRIEF DESCRIPTION OF THE DRAWINGS

FIGS. 28A and 28B show a modification of the first embodiment in which FIG. 28A is a block diagram of the modification, and FIG. 28B is a plan view showing projected images of the light-receiving elements to the object space side of the focus detection optical system;

DETAILED DESCRIPTION OF THE PREFERRED EMBODIMENTS

Figure 1:
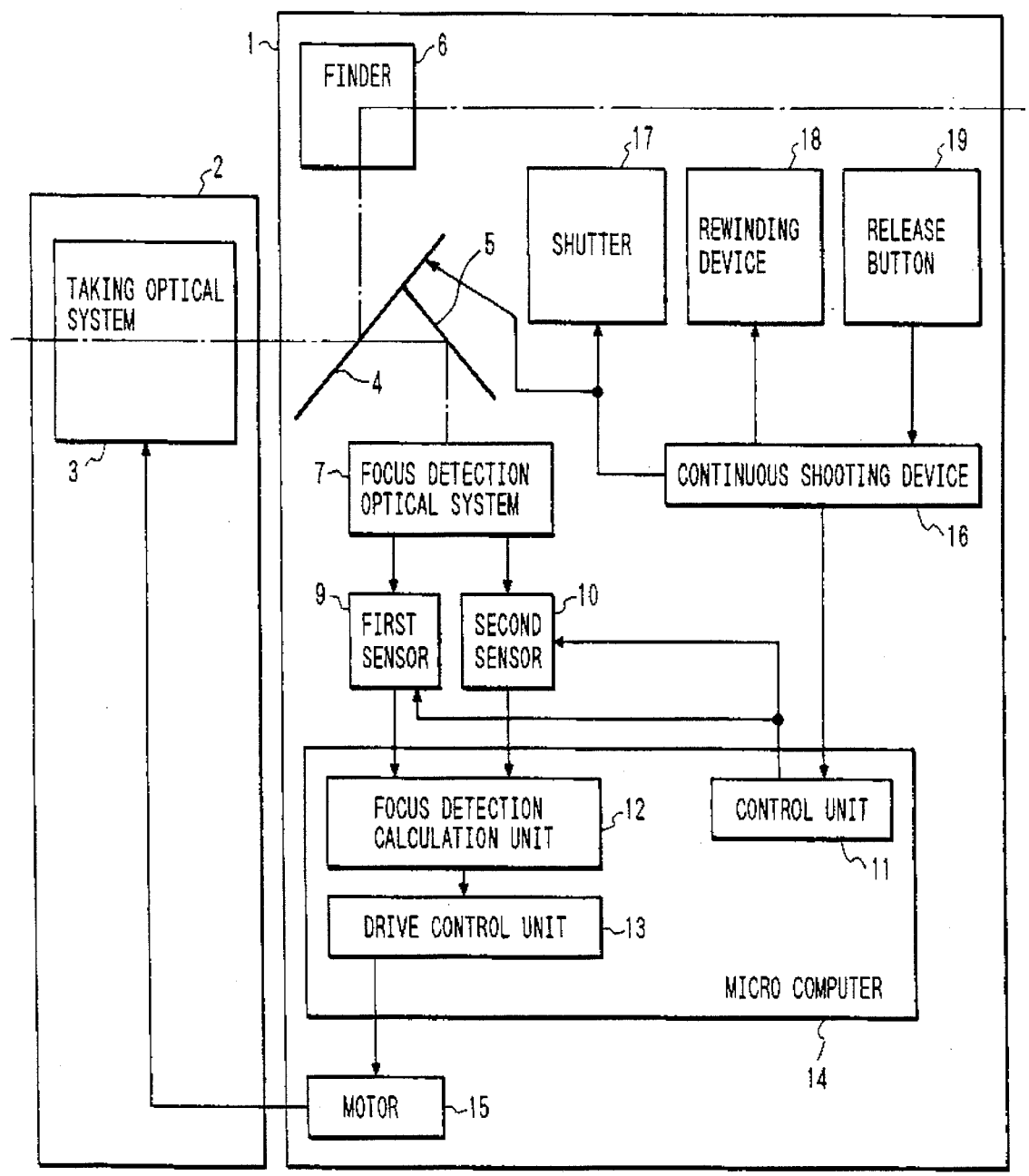
FIG. 1 is a block diagram showing an arrangement of an embodiment according to the first aspect of the present invention.

FIG. 1 is a block diagram showing an arrangement of an embodiment according to the first aspect of a camera of the present invention.

A lens 2 is exchangeably mounted on a body 1, and FIG. 1 illustrates a state wherein the lens 2 is mounted on the body 1. The lens 2 includes a taking optical system 3. A light beam originating from an object and passing through the taking optical system 3 is split by a main mirror 4 comprising a half mirror in the directions of a sub mirror 5 and a finder 6. The light beam further deflected by the sub mirror 5 in the body bottom direction is guided to a focus detection optical system 7 which is arranged near the prospective focal plane of the taking optical system 3.

Figure 2:
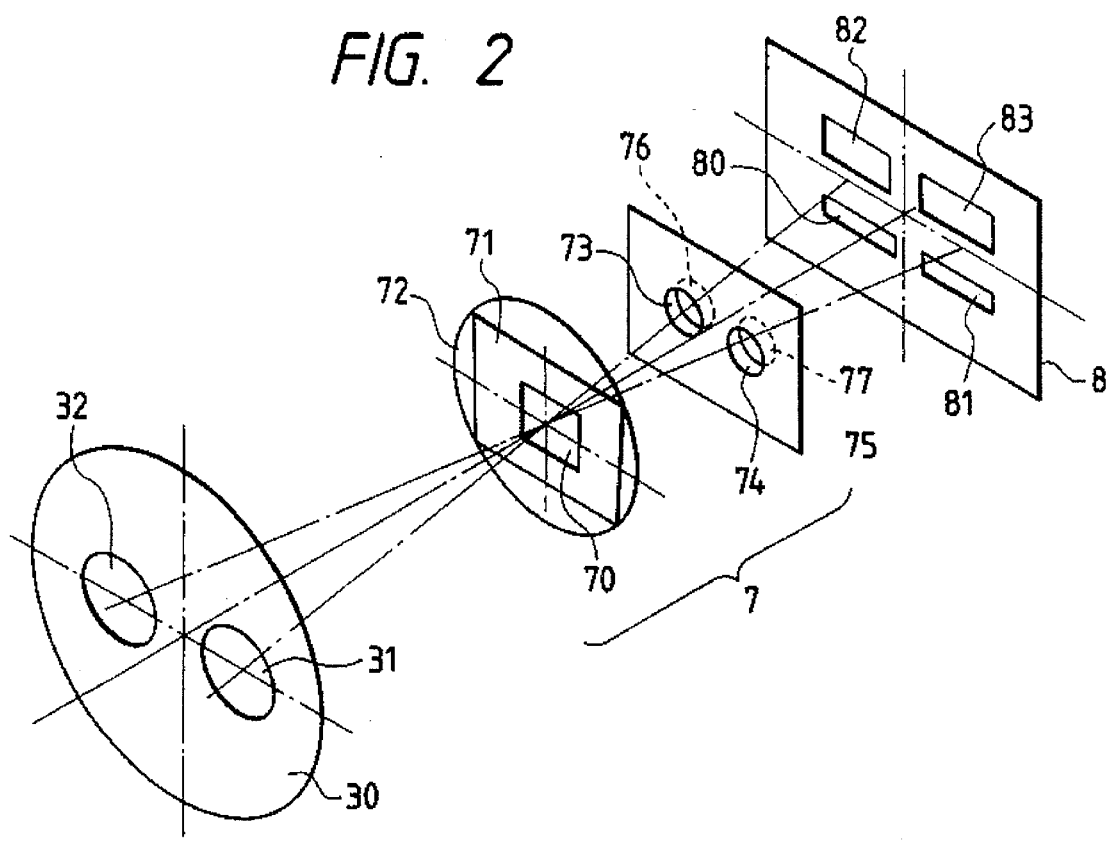
FIG. 2 is a perspective view showing an arrangement of a focus detection optical system and a charge accumulation type sensor of the embodiment shown in FIG. 1.

FIG. 2 shows the arrangement of the focus detection optical system 7 and a charge accumulation type sensor 8.

The focus detection optical system 7 comprises a field mask 71 having an aperture portion 70, a condenser lens 72, a diaphragm mask 75 having a pair of diaphragm aperture portions 73 and 74, and a pair of re-imaging lenses 76 and 77. The charge accumulation type sensor 8 comprises two pairs of light-receiving portions 80, 81, 82, and 83. A primary image formed near the aperture portion 70 on the optical axis by the taking optical system 3 is re-imaged as a pair of secondary images on the two pairs of light-receiving portions 80 and 82, and 81 and 83.

Figure 3:
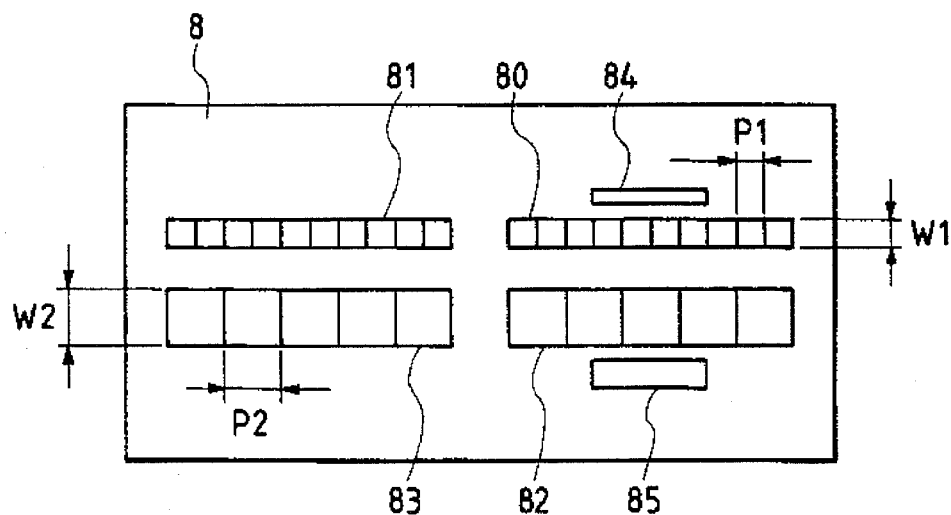
FIG. 3 is a plan view showing the arrangement of the sensor shown in FIG. 2.

As shown in FIG. 3, each of the light-receiving portions 80 and 81 consists of a plurality of pixels which are arranged at a pitch P1 and have a height W1. On the other hand, each of the light-receiving portions 82 and 83 also consists of a plurality of pixels, which are arranged at a pitch P2 (>P1) and have a height W2 (>W1). Since the pixel area P2×W2 of each of the light-receiving portions 82 and 83 is larger than the pixel area P1×W1 of each of the light-receiving portions 80 and 81, the light-receiving portions 82 and 83 require a shorter charge accumulation time for obtaining a given output level than that of the light-receiving portions 80 and 81.

Monitor sensors 84 and 85 for monitoring the light amounts on the light-receiving portions are arranged near the light-receiving portions 80 and 82. Accumulation of the outputs from the monitor sensors 84 and 85 starts simultaneously with the beginning of charge accumulation of the light-receiving portions 80 to 83, and when the accumulated output levels reach a predetermined level, the charge accumulation amounts of the light-receiving portions 80 to 83 reach the predetermined level, thus ending charge accumulation.

In the above-mentioned arrangement, the pair of diaphragm aperture portions 73 and 74 are projected by the condenser lens 72 onto a pair of areas 31 and 32, symmetrical about the optical axis, on a surface 30 near the exit pupil of the taking optical system 3, and a light beam passing through these regions forms the primary image at a position near the field mask 71. The primary image formed on the aperture portion 70 of the field mask 71 passes through the condenser lens 72 sand the pair of diaphragm aperture portions 73 and 74, and is re-imaged as a pair of secondary images on the light-receiving portions 80 and 82, and the light-receiving portions 81 and 83 of the charge accumulation type sensor 8 by the pair of re-imaging lenses 76 and 77.

The intensity distributions of the pair of secondary images are photoelectrically converted into electrical object image signals by the light-receiving portions 80 and 82, and the light-receiving portions 81 and 83. At this time, since the light-receiving portions 80 and 81 have a different pixel area from that of the light-receiving portions 82 and 83, charge accumulation times of these portions are independently set so as to obtain a proper output level for focus detection calculation processing.

Note that the light-receiving portions 80 and 81 constitute a first sensor 9 in FIG. 1, and the light-receiving portions 82 and 83 constitute a second sensor 10 therein. These sensors are controlled by a control unit 11 in a microcomputer 14 (to be described later).

The pair of electrical object image signals from the first or second sensor 9 or 10 are fetched by the microcomputer 14.

A focus detection calculation unit 12 detects a defocus amount d between the image surface and the prospective focal plane of the taking optical system 3 by calculating a relative positional relationship between these object image signals.

A drive control unit 13 in the microcomputer 14 controls the rotational direction and amount of a motor 15 in accordance with the defocus amount d. The motor 15 is coupled to the taking optical system 3, and drives the taking optical system 3 in the optical axis direction, so that the defocus amount d becomes zero. Thus, an in-focus state of the taking optical system 3 is attained.

A continuous shooting device 16 controls operations of the main mirror 4, the sub mirror 5, a shutter 17, and a rewinding device 18 in accordance with a shooting mode (a one-frame shooting mode or a continuous shooting mode) set by a photographer and the operation state of a release button 19, thus executing a one-frame shooting operation or a continuous shooting operation. The information of the shooting mode set by the photographer and information of the operation state in a shooting operation are input to the control unit 11, thereby controlling the first and second sensors 9 and 10. More specifically, in the continuous shooting mode, the control unit 11 operates the second sensor 10; otherwise, the unit 11 operates the first sensor 9.

Figure 4:
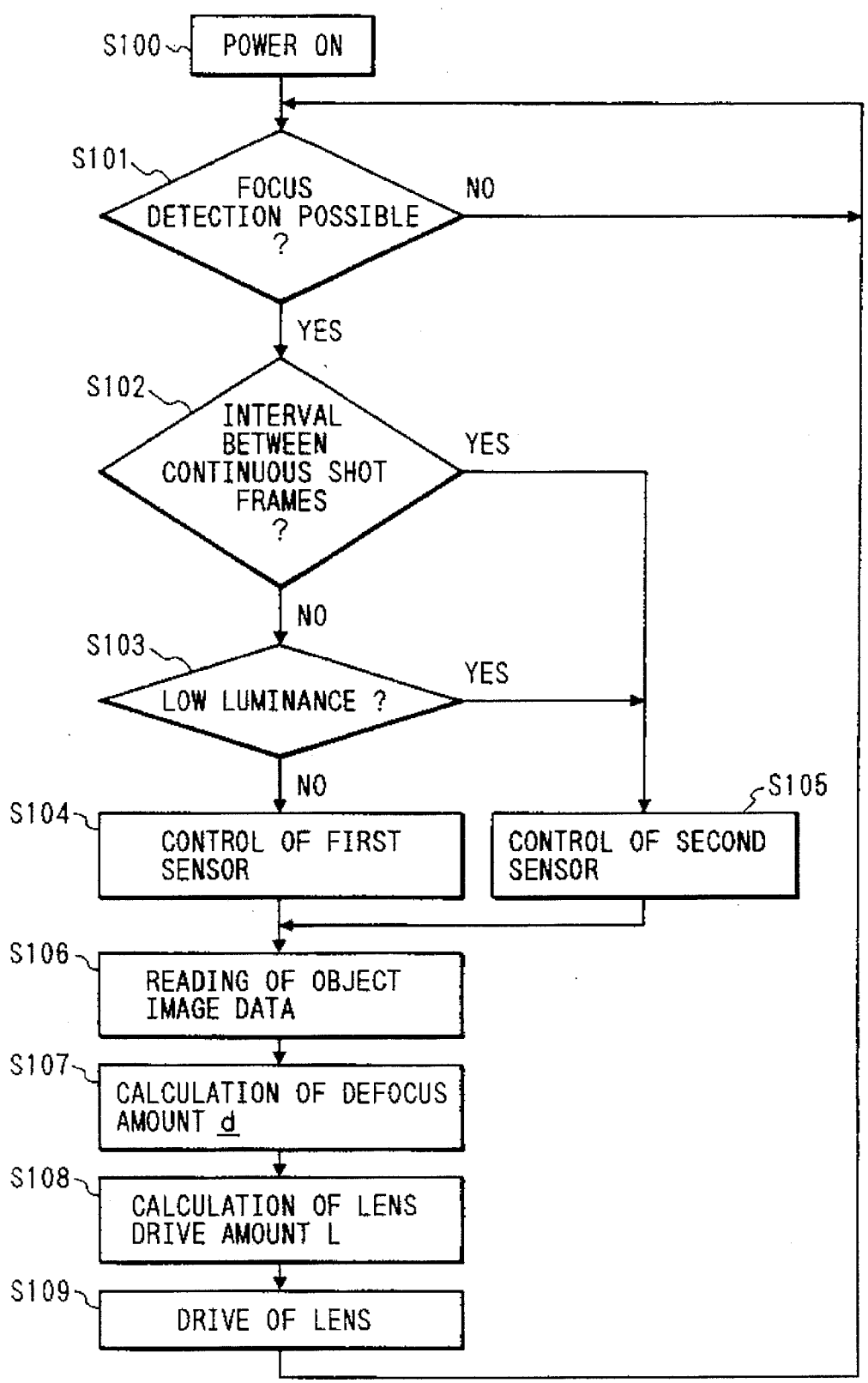
FIG. 4 is a flow chart showing an operation of a microcomputer.

FIG. 4 is an operation flow chart of the microcomputer 14 constituting the control unit 11, the focus detection calculation unit 12, and the drive control unit 13.

When a power switch of the camera is turned on in step S100, the flow advances to step S101 to check if a focus detection operation is possible. If Y (YES) in step S101, the flow advances to step S102. The focus detection possible state is a state wherein the shooting operation by the continuous shooting device 16 is not performed, the main mirror 4 and the sub mirror 5 are inserted in the optical path, and an object image is formed on the first and second sensors 9 and 10 by a light beam passing through the taking optical system 3.

In step S102, it is checked, based on information from the continuous shooting device 16, if the current timing corresponds to an interval between continuous shot frames. If Y in step S102, the flow advances to step S105; otherwise, the flow advances to step S103. If the current timing does not correspond to an interval between continuous shot frames, it is checked in step S103 if the object luminance is low. If Y in step S103, the flow advances to step S105; otherwise, the flow advances to step S104.

When the current timing corresponds to an interval between continuous shot frames, or when the object luminance is low even during the continuous shooting operation, the high-sensitivity second sensor 10 is selected to shorten the AF time between each two adjacent frames, and the charge accumulation time of the second sensor 10 is controlled in step S105.

More specifically, when the charge accumulation time is prolonged due to a low luminance, and the autofocus response time is prolonged, or when the focus detection time is limited like in the interval between continuous shot frames, the high-sensitivity second sensor 10 is selected to shorten the charge accumulation time of the sensor, thereby shortening the autofocus response time.

On the other hand, when the current timing does not correspond to an interval between continuous shot frames, and the object luminance is high, the first sensor 9 having a relatively low sensitivity is selected, and the charge accumulation control of the sensor 9 is performed in step S104.

The first sensor 9 has a high detection performance for a small object since it has a smaller pixel pitch and height than those of the second sensor 10, as shown in FIG. 3. More specifically, when the current timing does not correspond to an interval between continuous shot frames, and the object luminance is high, since a short response time is not required, the first sensor 9 having a relatively low sensitivity is selected while placing an importance on the small object detection performance.

Note that the object luminance may be detected based on an output from a photometry sensor (not shown) or may be determined based on the charge accumulation times of the first and second sensors 9 and 10.

In step S106, object image data is read from the first or second sensor 9 or 10, and in step S107, the defocus amount d is calculated by processing the read object image data. In step S108, a lens drive amount L indicating the drive amount of the taking optical system 3 to attain an in-focus state is calculated in accordance with the defocus amount d. In step S109, the motor 105 is driven to move the taking optical system 3 by the lens drive amount L. Thereafter, the flow returns to step S101 to repeat the above-mentioned operations.

In this embodiment, the second sensor 10 is selected at a timing corresponding to an interval between continuous shot frames. Alternatively, when the continuous shooting mode is set, the second sensor 10 may always be selected.

Also, when the object luminance is high even at a timing corresponding to an interval between continuous shot frames, the first sensor 9 having a lower sensitivity than that of the second sensor 10 may be selected.

Figure 5:
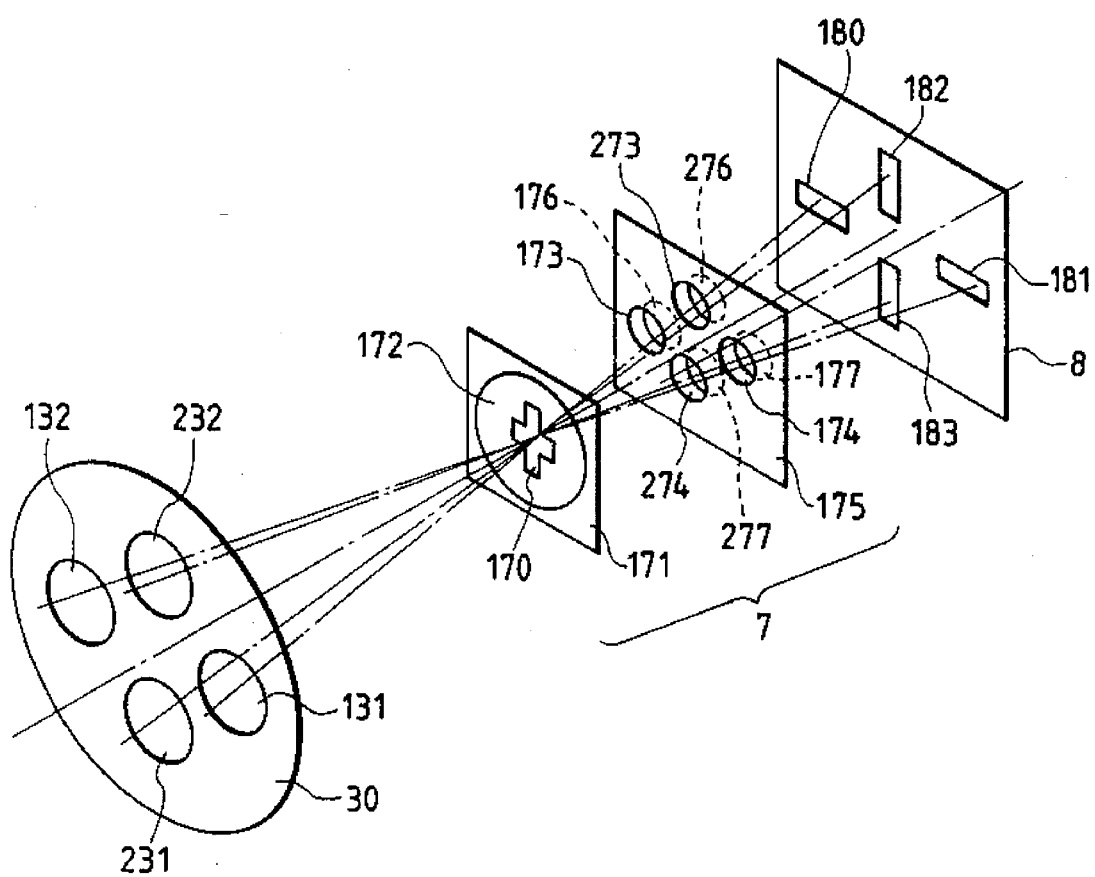
FIG. 5 is a perspective view showing another arrangement of the focus detection optical system and the charge accumulation type sensor.

FIG. 5 shows an arrangement of the focus detection optical system 7 and the charge accumulation type sensor 8 of another embodiment according to the first aspect.

The focus detection optical system 7 comprises a field mask 171 having a cross-shaped aperture portion 170, a condenser lens 172, a diaphragm mask 175 having two pairs of diaphragm aperture portions 173, 174, 273, and 274, and two pairs of re-imaging lenses 176, 177, 276, and 277. The charge accumulation type sensor 8 comprises two pairs of light-receiving portions 180, 181, 182, and 183. A primary image formed near the aperture 170 on the optical axis by the taking optical system 3 is re-imaged as two pairs of secondary images on the light-receiving portions 180 and 182, and the light-receiving portions 181 and 183.

Figure 6:
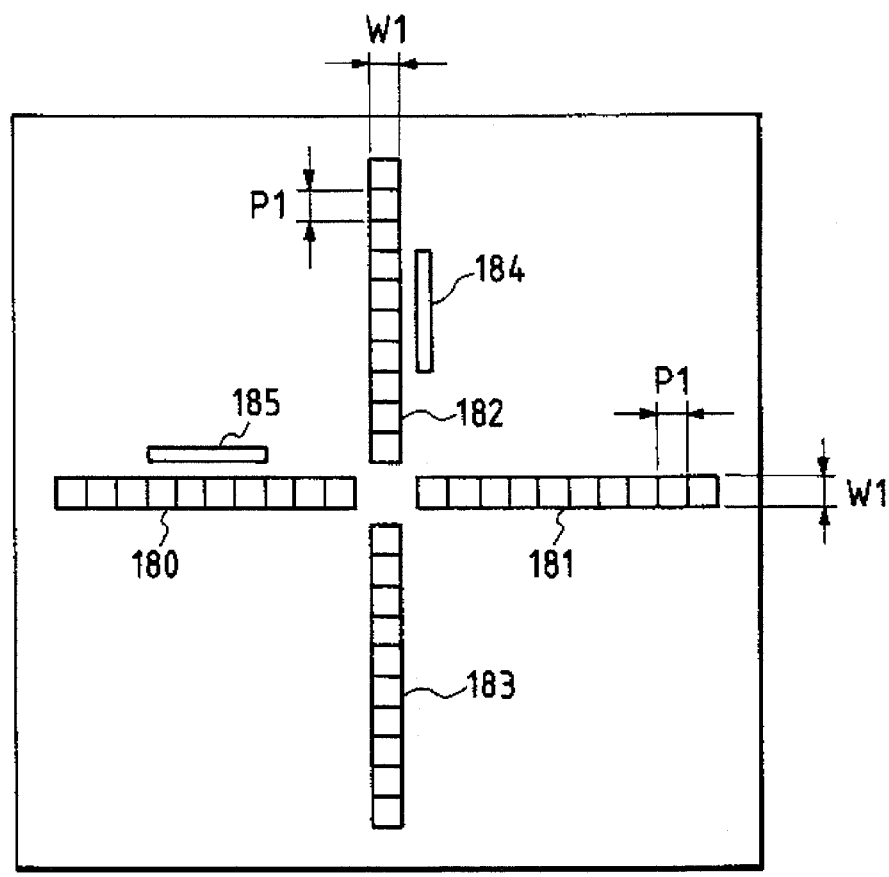
FIG. 6 is a plan view showing the arrangement of the sensor shown in FIG. 5.

FIG. 6 shows the arrangement of the light-receiving portions 180 to 183.

Each of the light-receiving portions 180 to 183 consists of a plurality of pixels which are arranged at a pitch P1 and have a height W1. Since the pixel area P1×W1 of each of the light-receiving portions 182 and 183 is equal to the pixel area P1×W1 of each of the light-receiving portions 180 and 181, the accumulation times for obtaining a given output level at a given luminance are equal to each other. Monitor sensors 184 and 185 for monitoring the light amounts on the light-receiving portions are arranged near the light-receiving portions 180 and 182. Accumulation of the outputs from the monitor sensors 184 and 185 starts simultaneously with the beginning of charge accumulation of the light-receiving portions 180 to 183, and when the accumulated output levels reach a predetermined level, the charge accumulation amounts of the light-receiving portions 180 to 183 reach the predetermined level, thus ending charge accumulation.

Figure 7:
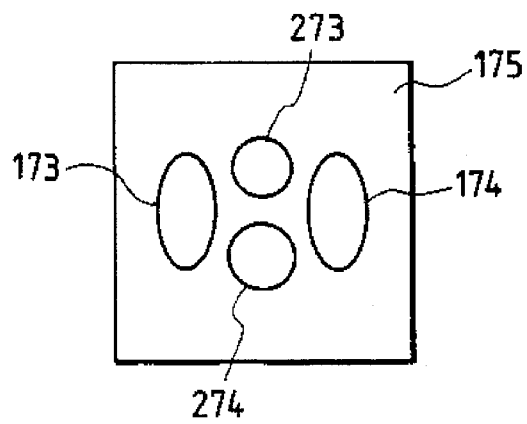
FIG. 7 is a plan view showing an arrangement of a diaphragm mask of the focus detection optical system shown in FIG. 5.

FIG. 7 shows the arrangement of the two pairs of diaphragm aperture portions 173, 174, 273, and 274 of the diaphragm mask 175. The interval between the centers of gravity of the apertures and the aperture area of the diaphragm aperture portions 173 and 174 are set to be larger than those of the diaphragm aperture portions 273 and 274.

Figure 8:
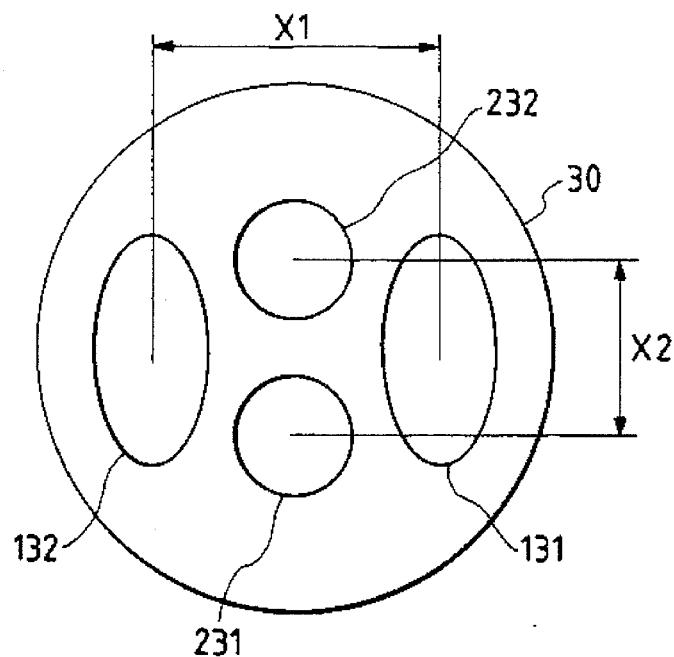
FIG. 8 is a plan view showing a pupil area corresponding to the focus detection optical system shown in FIG. 5.

In the above-mentioned arrangement, as shown in FIG. 8, the pair of diaphragm aperture portions 173 and 174 are projected onto a pair of areas 131 and 132, symmetrical about the optical axis, on the surface 30 near the exit pupil of the taking optical system by the condenser lens 172, and the other pair of diaphragm aperture portions 273 and 274 are projected onto a pair of areas 231 and 232, symmetrical about the optical axis, on the surface 30 near the exit pupil of the taking optical system by the condenser lens 172. An area S1 of each of the areas 131 and 132 is larger than an area S2 of each of the areas 231 and 232, and an interval X1 between the centers of gravity of the areas 131 and 132 is larger than an interval X2 between the centers of gravity of the areas 231 and 232.

A light beam passing through these regions forms a primary image near the field mask 171. The primary image formed on the aperture portion 170 of the field mask 171 passes through the condenser lens 172 and the two pairs of diaphragm aperture portions 173, 174, 273, and 274, and are re-imaged as two pairs of secondary images on the light-receiving portions 180 and 182 and the light-receiving portions 181 and 183 of the charge accumulation type sensor 8 by the two pairs of re-imaging lenses 176, 177, 276, and 277.

The intensity distributions of the two pairs of secondary images are photoelectrically converted into electrical object image signals by the light-receiving portions 180 and 182 and the light-receiving portions 181 and 183. At this time, since the light-receiving portions 180 and 182 and the light-receiving portions 181 and 183 receive object images formed by light beam components passing through the pupil areas having different areas although they have the same pixel area, when the charge accumulation time is set to obtain a proper output level for focus detection calculation processing at a given object luminance, the charge accumulation time of the light-receiving portions 180 and 181 becomes shorter than that of the light-receiving portions 182 and 183. More specifically, the light-receiving portions 180 and 181 correspond to the high-sensitivity second sensor 10, and the light-receiving portions 182 and 183 correspond the relatively low-sensitivity first sensor 9.

The operation of the focus detection optical system 7 and the charge accumulation type sensor 8 of this embodiment is the same as that executed when the focus detection optical system and the charge accumulation type sensor shown in FIG. 2 are used. More specifically, when the object luminance is low or when the short response time is required like in a continuous shooting operation, the high-sensitivity second sensor 10 is selected; when the object luminance is high or when a continuous shooting operation is not performed, the relatively low-sensitivity first sensor 9 is selected. In this embodiment, the reason why the relatively low-sensitivity first sensor 9 is selected when the object luminance is high or when a continuous shooting operation is not performed is as follows. That is, as shown in FIG. 8, since the interval X2 between the centers of gravity of the areas 231 and 232 corresponding to the first sensor 9 is smaller than the interval X1 between the centers of gravity of the areas 131 and 132 corresponding to the second sensor 10, the first sensor 9 has a smaller image shift amount corresponding to a defocus amount than that of the second sensor 9, and can detect a larger defocus amount than the second sensor 10 for a given image shift amount.

More specifically, when a short autofocus response time is required, the second sensor 10 is selected while placing an importance on the response time; when a short response time is not required, the first sensor 9 is selected while placing an importance on the defocus detection performance.

Figure 9:
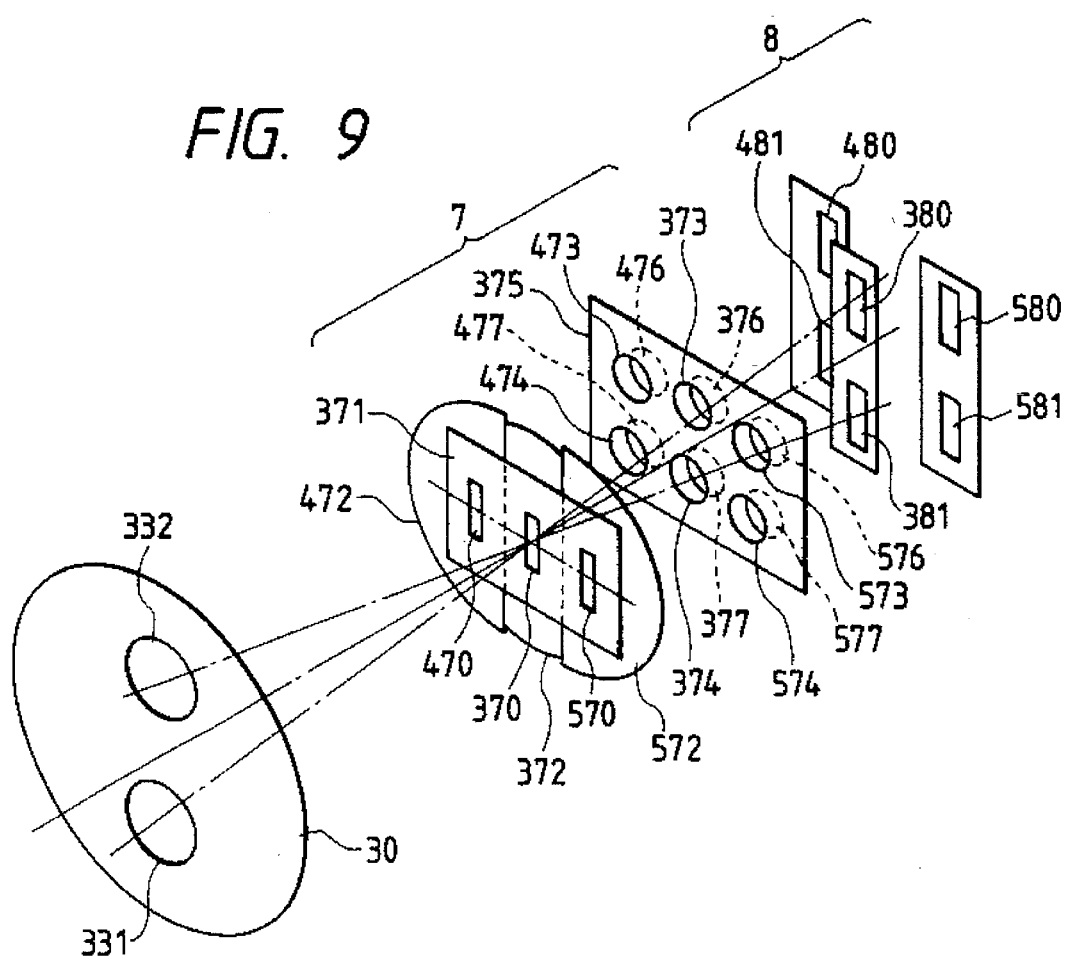
FIG. 9 is a perspective view showing still another arrangement of the focus detection optical system and the charge accumulation type sensor.

FIG. 9 shows an arrangement of the focus detection optical system 7 and the charge accumulation type sensor 8 of still another embodiment according to the first aspect.

The focus detection optical system 7 has three re-imaging optical systems corresponding to three focus detection areas, i.e., the central area in FIG. 9 and the right and left areas thereof. The focus detection optical system 7 comprises a field mask 371 having aperture portions 370, 470, and 570, condenser lenses 372, 472, and 572, a diaphragm mask 375 having three pairs of diaphragm aperture portions 373, 374, 473, 474, 573, and 574, and three pairs of re-imaging lenses 376, 377, 476, 477, 576, and 577. The charge accumulation type sensor 8 comprises three pairs of light-receiving portions 380, 381, 480, 481, 580, and 581.

A primary image formed near the aperture portion 370 on the optical axis by the taking optical system 3 is re-imaged as a pair of secondary images on the light-receiving portions 380 and 381, a primary image formed near the aperture portion 470 is re-imaged as a pair of secondary images on the light-receiving portions 480 and 481, and a primary image formed near the aperture portion 570 is re-imaged as a pair of secondary images on the light-receiving portions 580 and 581.

Figure 10:
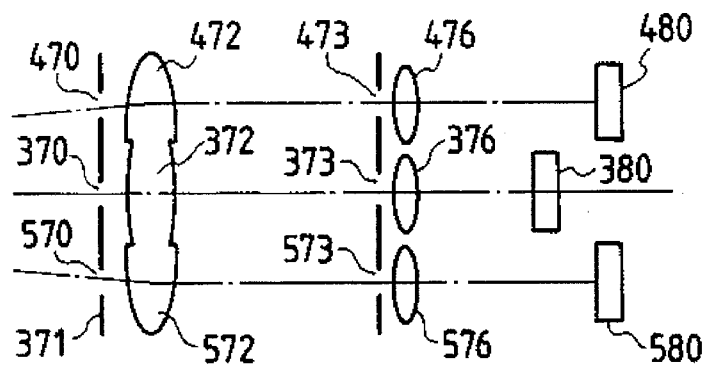
FIG. 10 is a side view of the focus detection optical system shown in FIG. 9.

FIG. 10 is a side view obtained when the focus detection optical system 7 shown in FIG. 9 is viewed from a direction perpendicular to the aligning direction of the aperture portions 370, 470, and 570, and illustrates that the re-imaging magnification of the central re-imaging optical system is smaller than those of the right and left re-imaging optical systems. The reason why the magnification of the central re-imaging optical system is intentionally set to be different from those of the right and left re-imaging optical systems is as follows. When the re-imaging lenses 376, 377, 476, 477, 576, and 577 are integrally molded, and when adjustment between the direction of a line segment connecting the optical axes of the re-imaging lenses 376 and 377 and the aligning direction of the light-receiving portions 380 and 381, adjustment between the direction of a line segment connecting the optical axes of the re-imaging lenses 476 and 477 and the aligning direction of the light-receiving portions 480 and 481, and adjustment between the direction of a line segment connecting the optical axes of the re-imaging lenses 576 and 577 and the aligning direction of the light-receiving portions 580 and 581 are independently performed, the light-receiving portions 380, 381, 480, 481, 580, and 581 must be formed on different chips 382, 482, and 582. In this case, in order to avoid an interference among the positions of the light-receiving portions formed on the different chips, different magnifications must be set to arrange the plurality of chips at different positions in the optical axis direction.

Figure 11:
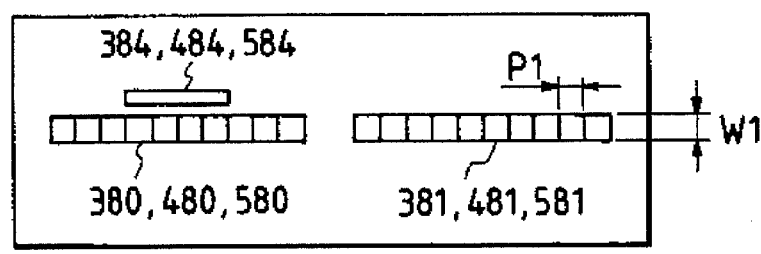
FIG. 11 is a plan view showing the arrangement of the sensor shown in FIG. 9.

As shown in FIG. 11, each of the three pairs of light-receiving portions 380, 381, 480, 481, 580, and 581 consists of a plurality of pixels, which are arranged at a pitch P1 and have a height W1.

Figure 12:
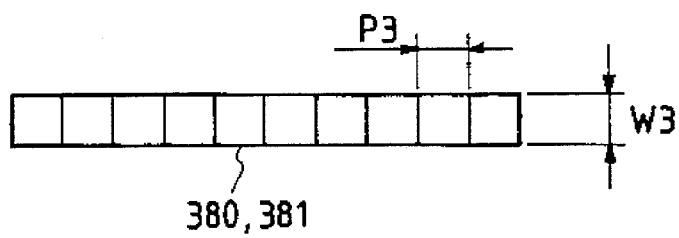
FIG. 12 is an explanatory view obtained when the right and left sensors shown in FIG. 9 are projected onto a primary image surface.

FIG. 12 is a plan view obtained when the light-receiving portions 380 and 381 are projected onto the primary image surface by the re-imaging lenses 376 and 377, and the projected pixels have a pitch P3 and a height W3.

Figure 13:
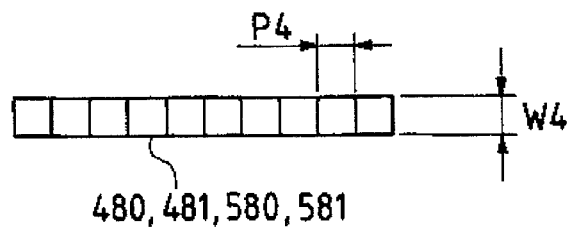
FIG. 13 is an explanatory view obtained when the central sensor shown in FIG. 9 is projected onto the primary image surface.
Figure 14:
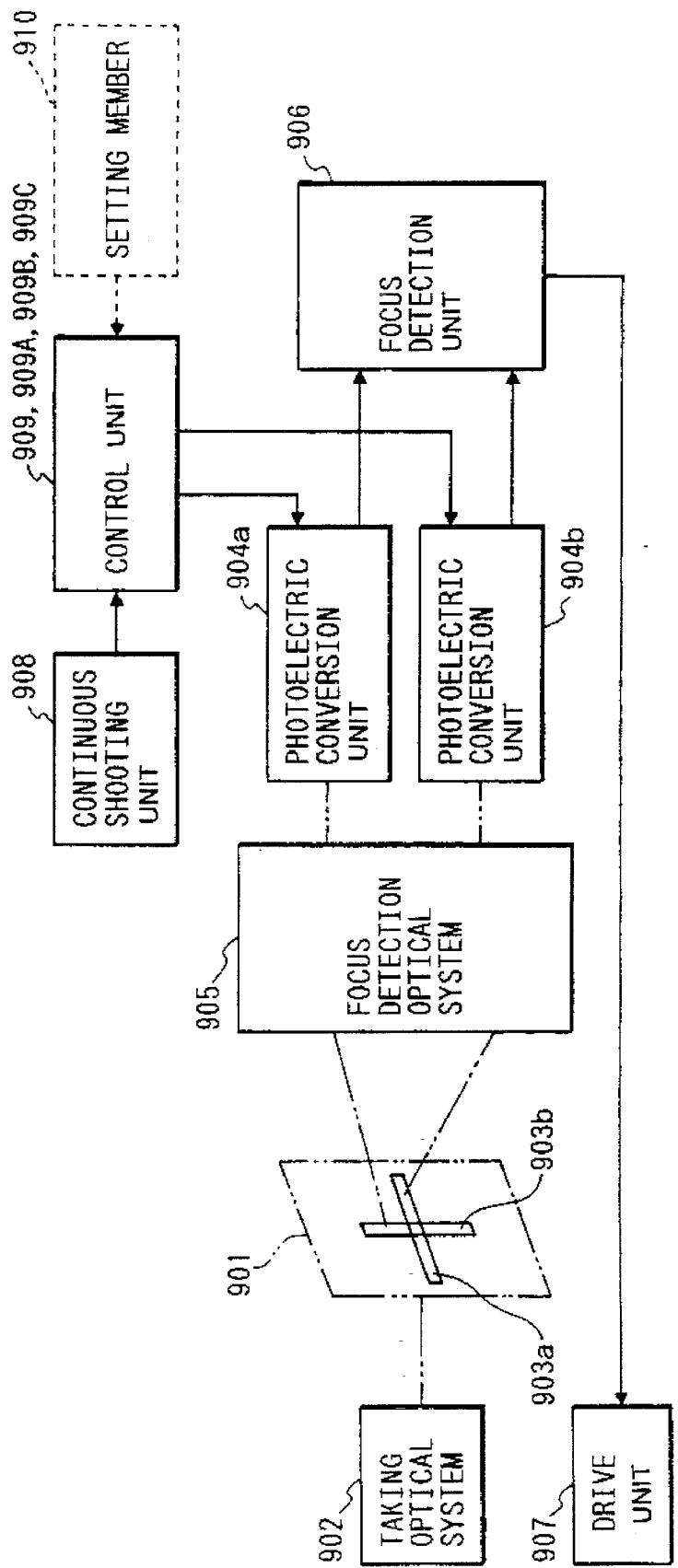
FIG. 14 is a schematic block diagram showing an arrangement of a camera according to the second aspect of the present invention.

FIG. 13 is a plan view obtained when the light-receiving portions 480, 481, 580, and 581 are projected onto the primary image surface by the re-imaging lenses 476, 477, 576, and 577, and the projected pixels have a pitch P4 (<P3) and a height W4 (<W3) since the re-imaging magnification is larger than that of the central optical system.

Since the pixel area P3×W3 of each of the light-receiving portions 380 and 381 is larger than the pixel area P4×W4 of each of the light-receiving portions 480, 481, 580, and 581, the accumulation time of the light-receiving portions 380 and 381 becomes shorter than that of the light-receiving portions 480, 481, 580, and 581 so as to obtain a given output level. More specifically, the light-receiving portions 380 and 381 correspond to the high-sensitivity second sensor 10, and the light-receiving portions 480, 481, 580, and 581 correspond to the relatively low-sensitivity first sensor 9.

Monitor sensors 384, 484, and 584 for monitoring the light amounts on the light-receiving portions are arranged near the light-receiving portions 380, 480, and 580. Accumulation of the outputs from the monitor sensors 384, 484, and 584 begins simultaneously with the beginning of charge accumulation of the light-receiving portions 380, 381, 480, 481, 580, and 581, and when the accumulated output levels reach a predetermined level, the charge accumulation amounts of the light-receiving portions 380, 381, 480, 481, 580, and 581 reach the predetermined level, thus ending the charge accumulation.

In the above-mentioned arrangement, the three pairs of diaphragm aperture portions 373, 374, 473, 474, 573, and 574 are projected onto a pair of areas 331 and 332, symmetrical about the optical axis, on the surface 30 near the exit pupil of the taking optical system 3 by the condenser lenses 372, 472, and 572, and a light beam passing through these areas forms a primary image near the field mask 371. The primary image formed on the aperture portion 370 of the field mask 371 passes through the condenser lens 372 and the pair of diaphragm aperture portions 373 and 374, and is re-imaged as a pair of secondary images on the light-receiving portions 380 and 381 of the charge accumulation type sensor 8 by the pair of re-imaging lenses 376 and 377. The primary image formed on the aperture portion 470 of the field mask 371 passes through the condenser lens 472 and the pair of diaphragm aperture portions 473 and 474, and is re-imaged as a pair of secondary images on the light-receiving portions 480 and 481 of the charge accumulation type sensor 8 by the pair of re-imaging lenses 476 and 477. Furthermore, the primary image formed on the aperture portion 570 of the field mask 371 passes through the condenser lens 572 and the pair of diaphragm aperture portions 573 and 574, and is re-imaged as a pair of secondary images on the light-receiving portions 580 and 581 of the charge accumulation type sensor 8 by the pair of re-imaging lenses 576 and 577.

The intensity distributions of the three pairs of secondary images are photoelectrically converted into electrical object image signals by the light-receiving portions 380, 381, 480, 481, 580, and 581.

The operation of this embodiment is the same as that executed when the focus detection optical system and the charge accumulation type sensor shown in FIG. 2 are used. More specifically, when the object luminance is low or when a short response time is required like in a continuous shooting operation, the high-sensitivity second sensor 10, i.e., only the light-receiving portions 380 and 381 corresponding to the central focus detection region on the field are selected and operated. When the object luminance is high or when a continuous shooting operation is not performed, all the sensors, i.e., all the light-receiving portions 380, 381, 480, 481, 580, and 581 may be operated to calculate three defocus amounts, and a proper one of these defocus amounts may be selected, or only the light-receiving portions corresponding to a focus detection region manually selected by a photographer may be selectively operated.

More specifically, when a short autofocus response time is required, the second sensor 10 is selected while placing an importance on the response time; when a short response time is not required, one or both of the first and second sensors 9 and 10 are selected according to a photographer's choice.

As described above, according to the present invention, the first sensor and the second sensor having a higher sensitivity than that of the first sensor are arranged to receive an object image formed by the focus detection optical system. During a continuous shooting operation, the second sensor is preferentially operated, the defocus amount of the taking optical system is calculated based on the output from the second sensor, and the taking optical system is driven according to the calculated defocus amount to attain an in-focus state. For this reason, the focusing time between continuous shot frames can be shortened, and an autofocus operation with high detection precision can be realized even in a high-speed continuous shooting operation with a short interval between frames. Even in a low-luminance state, an autofocus operation with high detection precision and a high-speed continuous shooting operation can be performed without decreasing the frame speed.

Figure 15:
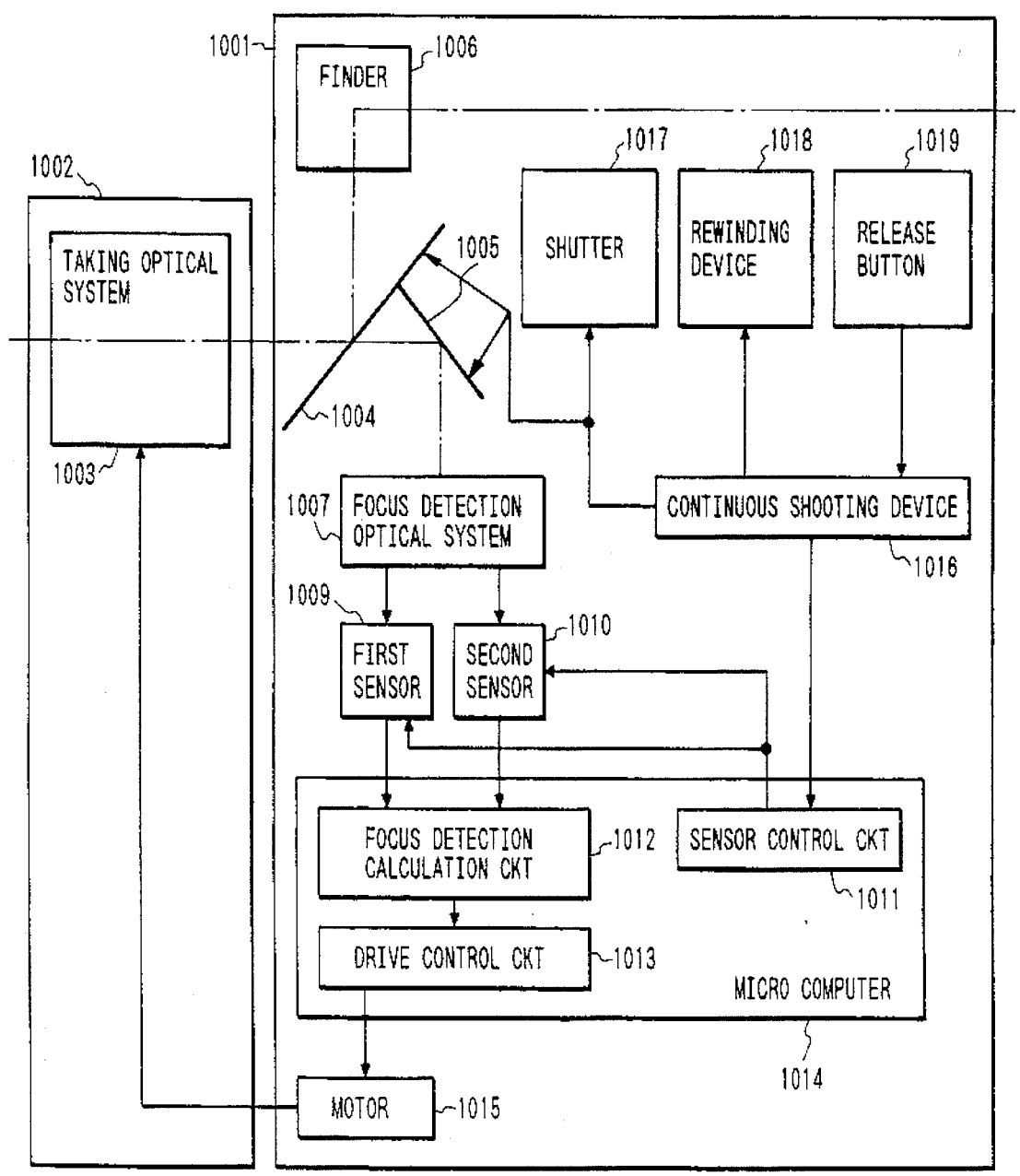
FIG. 15 is a block diagram showing an arrangement of the first embodiment according to the second aspect of the present invention.

FIG. 15 shows an arrangement of an embodiment according to the second aspect of the present invention.

A lens 1002 is exchangeably mounted on a body 1001, and FIG. 15 illustrates a state wherein the lens 1002 is mounted on the body 1001. The lens 1002 includes a taking optical system 1003. A light beam originating from all object and passing through the taking optical system 1003 is split by a main mirror 1004 comprising a half mirror in the directions of a sub mirror 1005 and a finder 1006. The light beam further deflected by the sub mirror 1005 in the body bottom direction is guided to a focus detection optical system 1007 which is arranged near the prospective focal plane of the taking optical system 1003.

Figure 16:
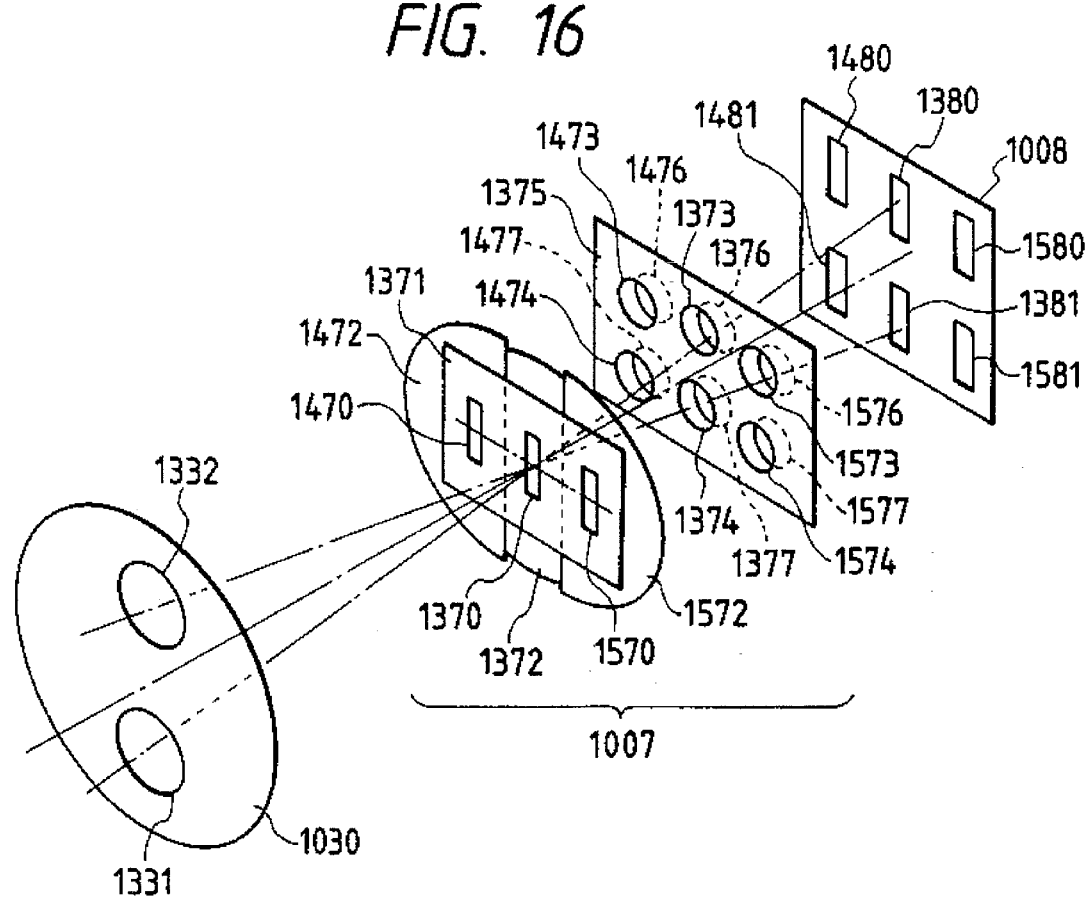
FIG. 16 is a perspective view showing an arrangement of a focus detection optical system and a charge accumulation type sensor of the embodiment.
Figure 17:
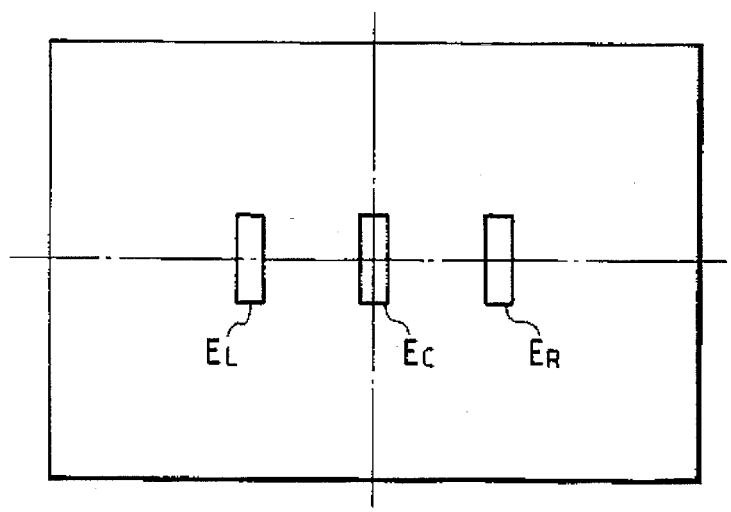
FIG. 17 is a plan view showing focus detection areas of the embodiment shown in FIG. 15.

FIG. 16 shows the arrangement of the focus detection optical system 1007 and a charge accumulation type sensor 1008, and FIG. 17 shows an arrangement of a plurality of focus detection areas set in a taking field.

In the taking field, as shown in FIG. 17, three focus detection areas are set. The focus detection areas include a central focus detection area $E_C$, a left focus detection area $E_L$, and a right focus detection area $E_R$ in the field. The focus detection optical system 1007 has three re-imaging optical systems corresponding to the three focus detection areas, i.e., central, right and left focus detection areas in the taking field.

The focus detection optical system 1007 comprises a field mask 1371 having aperture portions 1370, 1470, and 1570, condenser lenses 1372, 1472, and 1572, a diaphragm mask 1375 having three pairs of diaphragm aperture portions 1373, 1374, 1473, 1474, 1573, and 1574, and three pairs of re-imaging lenses 1376, 1377, 1476, 1477, 1576, and 1577. The charge accumulation type sensor 1008 comprises three pairs of light-receiving portions 1380, 1381, 1480, 1481, 1580, and 1581.

The three pairs of diaphragm aperture portions 1373, 1374, 1473, 1474, 1573, and 1574 are projected onto a pair of areas 1331 and 1332, symmetrical about the optical axis, on a surface 1030 near the exit pupil of the taking optical system 1008 by the condenser lenses 1372, 1472, and 1572, and a light beam passing through these areas forms a primary image near the field mask 1371.

The primary image formed on the aperture portion 1370 of the field mask 1371 passes through the condenser lens 1372 and the pair of diaphragm aperture portions 1373 and 1374, and is re-imaged as a pair of secondary images on the light-receiving portions 1380 and 1381 of the charge accumulation type sensor 1008 by the pair of re-imaging lenses 1376 and 1377.

The primary image formed on the aperture portion 1470 of the field mask 1371 passes through the condenser lens 1472 and the pair of diaphragm aperture portions 1473 and 1474, and is re-imaged as a pair of secondary images on the light-receiving portions 1480 and 1481 of the charge accumulation type sensor 1008 by the pair of re-imaging lenses 1476 and 1477.

Furthermore, the primary image formed on the aperture portion 1570 of the field mask 1371 passes through the condenser lens 1572 and the pair of diaphragm aperture portions 1573 and 1574, and is re-imaged as a pair of secondary images on the light-receiving portions 1580 and 1581 of the charge accumulation type sensor 1008 by the pair of re-imaging lenses 1576 and 1577.

The light intensity distributions of these three pairs of secondary images are converted into electrical object image signals by the light-receiving portions 1380, 1381, 1480, 1481, 1580, and 1581.

In this embodiment, the light-receiving portions 1480, 1481, 1580, and 1581 corresponding to the focus detection areas $E_L$ and $E_R$ serve as a first sensor 1009, and the light-receiving portions 1380 and 1381 corresponding to the focus detection area $E_C$ serve as a second sensor 1010.

When a continuous shooting operation is not performed, the two pairs of electrical object image signals from the first sensor 1009 and a pair of electrical object image signals from the second sensor 1010 are fetched by a microcomputer 1014. A focus detection calculation circuit 1012 of the microcomputer 1014 detects defocus amounts d1, d2, and d3 between the image surface and the prospective focal plane of the taking optical system 1003 on the three focus detection areas $E_L$, $E_C$, and $E_R$ by calculating the relative positional relationship among these object image signals. One, which indicates a far-focus state, i.e., a closer distance, of the three detected defocus amounts d1, d2, and d3 is selected as a final defocus amount d.

When a continuous shooting operation is performed, the pair of electrical object image signals from the second sensor 1010 are fetched by the microcomputer 1014. The focus detection calculation circuit 1012 in the microcomputer 1014 detects the defocus amount d2 between the image surface and the prospective focal plane of the taking optical system 1003 on the central focus detection area $E_C$ by calculating the relative positional relationship between these object image signals, and outputs the detected defocus amount as a final defocus amount d.

A drive control circuit 1013 included in the microcomputer 1014 controls the rotational direction and amount of a motor 1015 in accordance with the defocus amount d. The motor 1015 is coupled to the taking optical system 1003, and drives the taking optical system 1003 in the optical axis direction, so that the defocus amount d becomes zero. Thus, an in-focus state of the taking optical system 1003 is attained.

A continuous shooting device 1016 controls operations of the main mirror 1004, the sub mirror 1005, a shutter 1017, and a rewinding device 1018 in accordance with a shooting mode (a one-frame shooting mode or a continuous shooting mode) set by a photographer and the operation state of a release button 1019, thus executing a one-frame shooting operation or a continuous shooting operation. The information of the shooting mode set by the photographer and information of the operation state in a shooting operation are input to a sensor control circuit 1011, thereby controlling the first and second sensors 1009 and 1010. More specifically, the sensor control circuit 1011 operates the second sensor 1010 at a timing corresponding to an interval between continuous shot frames; otherwise, it operates both the first and second sensors 1009 and 1010.

Figure 18:
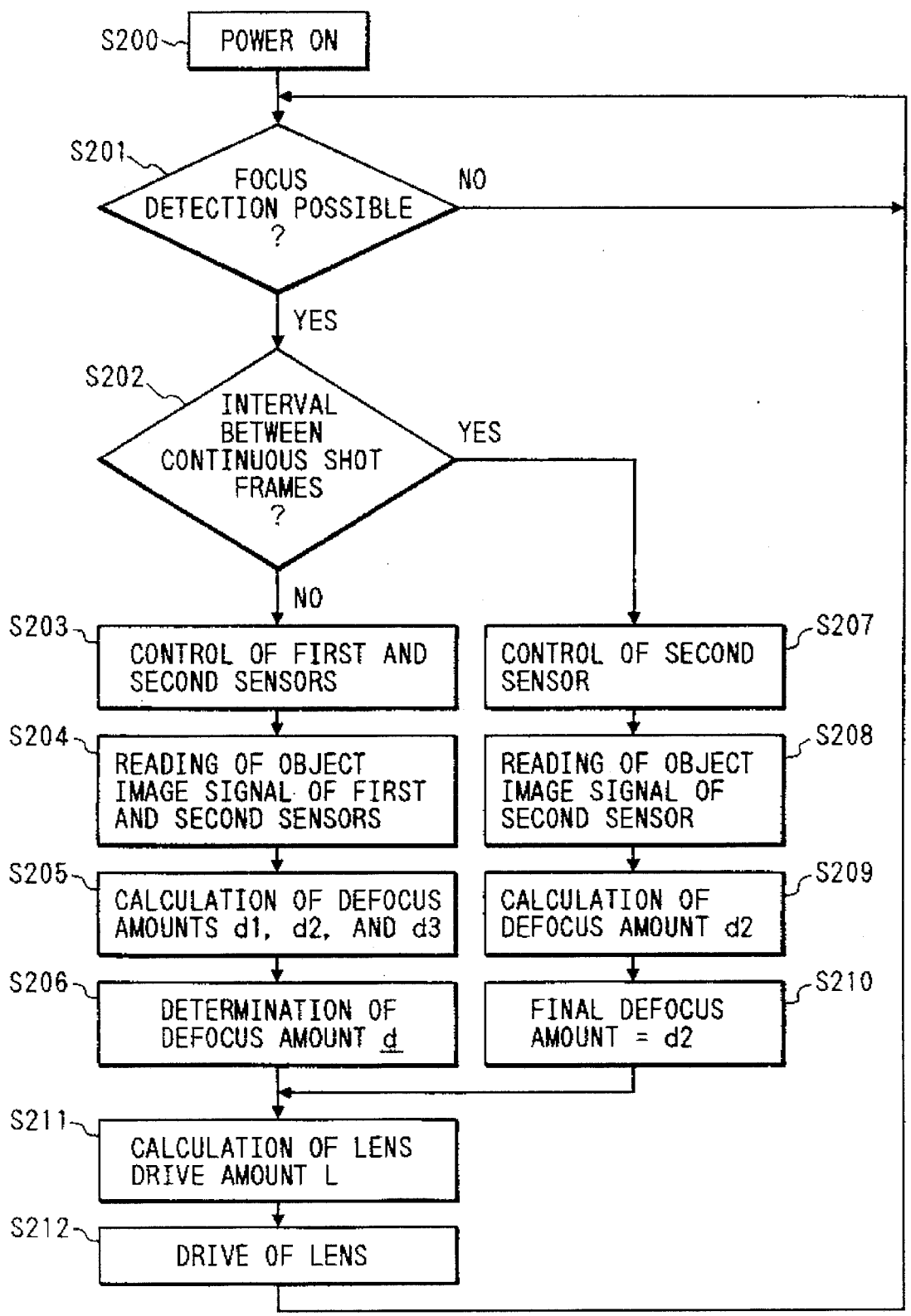
FIG. 18 is a flow chart showing an operation of a microcomputer of the embodiment shown in FIG. 15.

FIG. 18 is an operation flow chart of the microcomputer 1014 constituting the sensor control circuit 1011, the focus detection calculation circuit 1012, and the drive control circuit 1013. The operation of this embodiment will be described below with reference to the flow chart in FIG. 18.

When a power switch of the camera is turned on in step S200, the microcomputer 1014 starts a series of processing operations, and the flow advances to step S201. In step S201, it is checked if a focus detection operation is possible. If Y (YES) in step S201, the flow advances to step S202; otherwise, the control waits in step S201 until the focus detection operation is enabled. The focus detection possible state is a state wherein the shooting operation by the continuous shooting device 1016 is not performed, the main mirror 1004 and the sub mirror 1005 are inserted in the optical path, and an object image is formed on the first and second sensors 1009 and 1010 by a light beam passing through the taking optical system 1003.

In step S202, it is checked based on information from the continuous shooting device 1016 if the current timing corresponds to an interval between continuous shot frames. If Y in step S202, the second sensor 1010 is selected to shorten the AF time between frames, and the flow advances to step S207; otherwise, the flow advances to step S203. Note that the interval between continuous shot frames is an interval from when the mirror-down operation of the main mirror 1004 and the sub mirror 1005 has been completed until the next mirror-up operation is started. In step S203, the first and second sensors 1009 and 1010 are selected to perform a charge accumulation operation, and the flow advances to step S204. In step S204, object image signals from the first and second sensors 1009 and 1010 are read. In step S205, the defocus amounts d1, d2, and d3 corresponding to the focus detection areas $E_L$, $E_C$, and $E_R$ are calculated by processing the object image signals. In step S206, a defocus amount indicating the most far-focus state is determined as a final defocus amount from the defocus amounts d1, d2, and d3, and the flow then advances to step S211.

When the current timing corresponds to the interval between continuous shot frames in the continuous shooting mode, the second sensor 1010 is selected to perform a charge accumulation operation in step S207, and the flow advances to step S208. In step S208, object image signals from the second sensor 1010 are read, and in step S209, the defocus amount d2 corresponding to the focus detection area $E_C$ is calculated by processing the object image signals. In step S210, the defocus amount d2 is determined as a final defocus amount, and the flow advances to step S211.

In step S211, a lens drive amount L indicating the drive amount of the taking optical system 1003 to attain an in-focus state is calculated in accordance with the final defocus amount d. In step S212, the motor 1015 is driven to move the taking optical system 1003 by the lens drive amount L, and the flow then returns to step S201 to repeat the above-mentioned operations.

In this manner, since the focus detection operation is performed using the three focus detection areas except for the continuous shooting mode, the object pickup ability is high. Furthermore, in the continuous shooting mode, since the focus detection operation is performed by only the central focus detection area in the field, the AF time can be shortened, and a high-speed continuous shooting operation can be achieved. In addition, since an object is located at the center of the field with high possibility, even when the focus detection area to be used is limited to the central area in the field, the object pickup ability is not extremely lowered.

Figure 19:
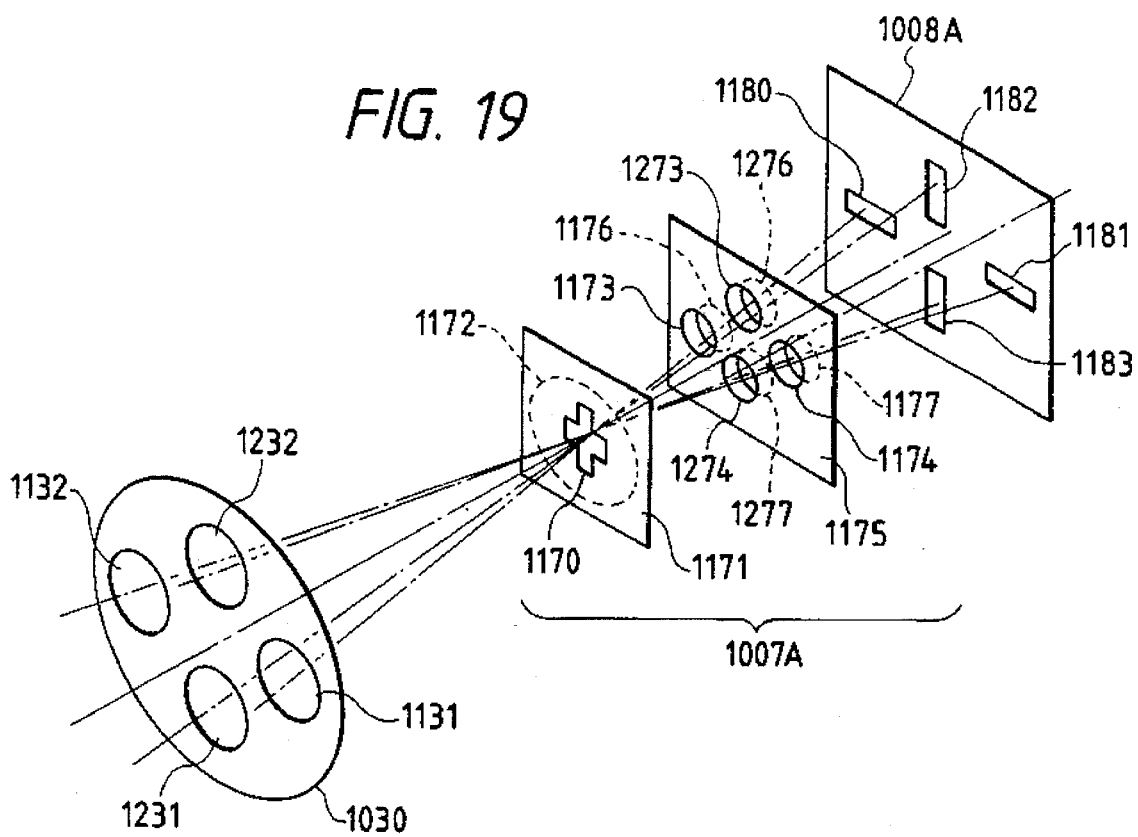
FIG. 19 is a perspective view showing an arrangement of a focus detection optical system and a charge accumulation type sensor of the second embodiment according to the second aspect of the present invention.
Figure 20:
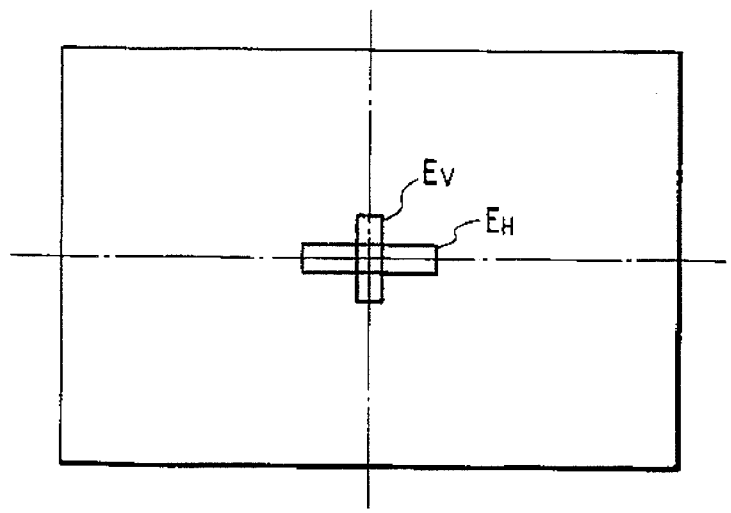
FIG. 20 is a plan view showing focus detection areas of the embodiment shown in FIG. 19.

FIG. 19 shows the arrangement of a focus detection optical system 1007A and a charge accumulation type sensor 1008A of another embodiment according to the second aspect of the present invention. FIG. 20 shows the arrangement of a vertical focus detection area $E_V$ and a horizontal focus detection area $E_H$ set in the taking field. Note that the arrangement of this embodiment is substantially the same as that shown in FIG. 15, except for the focus detection optical system 1007A and the charge accumulation type sensor 1008A, and a detailed illustration and description thereof will be omitted.

The focus detection optical system 1007A has two re-imaging optical systems corresponding to the vertical and horizontal focus detection areas $E_V$ and $E_H$ at the center of the field. The focus detection optical system 1007A comprises a field mask 1171 having a cross-shaped aperture portion 1170, a condenser lens 1172, a diaphragm mask 1175 having two pairs of diaphragm aperture portions 1173, 1174, 1273, and 1274, and two pairs of re-imaging lenses 1176, 1177, 1276, and 1277. The charge accumulation type sensor 1008A comprises two pairs of light-receiving portions 1180, 1181, 1182, and 1183.

One pair of diaphragm aperture portions 1173 and 1174 are projected onto a pair of areas 1131 and 1132, symmetrical about the optical axis, on a surface 1030 near the exit pupil of the taking optical system 1003 by the condenser lens 1172, and the other pair of diaphragm aperture portions 1273 and 1274 are projected onto a pair of areas 1231 and 1232, symmetrical about the optical axis, on the surface 1030 near the exit pupil of the taking optical system 1003 by the condenser lens 1172. A light beam passing through these areas forms a primary image near the field mask 1171. The primary image formed on the aperture portion 1170 of the field mask 1171 passes through the condenser lens 1172 and the two pairs of diaphragm aperture portions 1173, 1174, 1273, and 1274, and is re-imaged as two pairs of secondary images on the light-receiving portions 1180 and 1181 and the light-receiving portions 1182 and 1183 of the charge accumulation type sensor 1008A by the two pairs of re-imaging lenses 1176, 1177, 1276, and 1277. The light intensity distributions of the two pairs of secondary images are converted into electrical object image signals by the light-receiving portions 1180 and 1181 and the light-receiving portions 1182 and 1183.

In this embodiment, the light-receiving portions 1182 and 1183 corresponding to the focus detection area $E_V$ serve as the finest sensor 1009 shown in FIG. 15, and the light-receiving portions 1180 and 1181 corresponding to the focus detection area $E_H$ serve as the second sensor 1010 therein. When a short response time is required like in the continuous shooting operation, the sensor control circuit 1011 selects the second sensor 1010; when a continuous shooting operation is not performed, the circuit 1011 selects both the first and second sensors 1009 and 1010.

Figure 21:
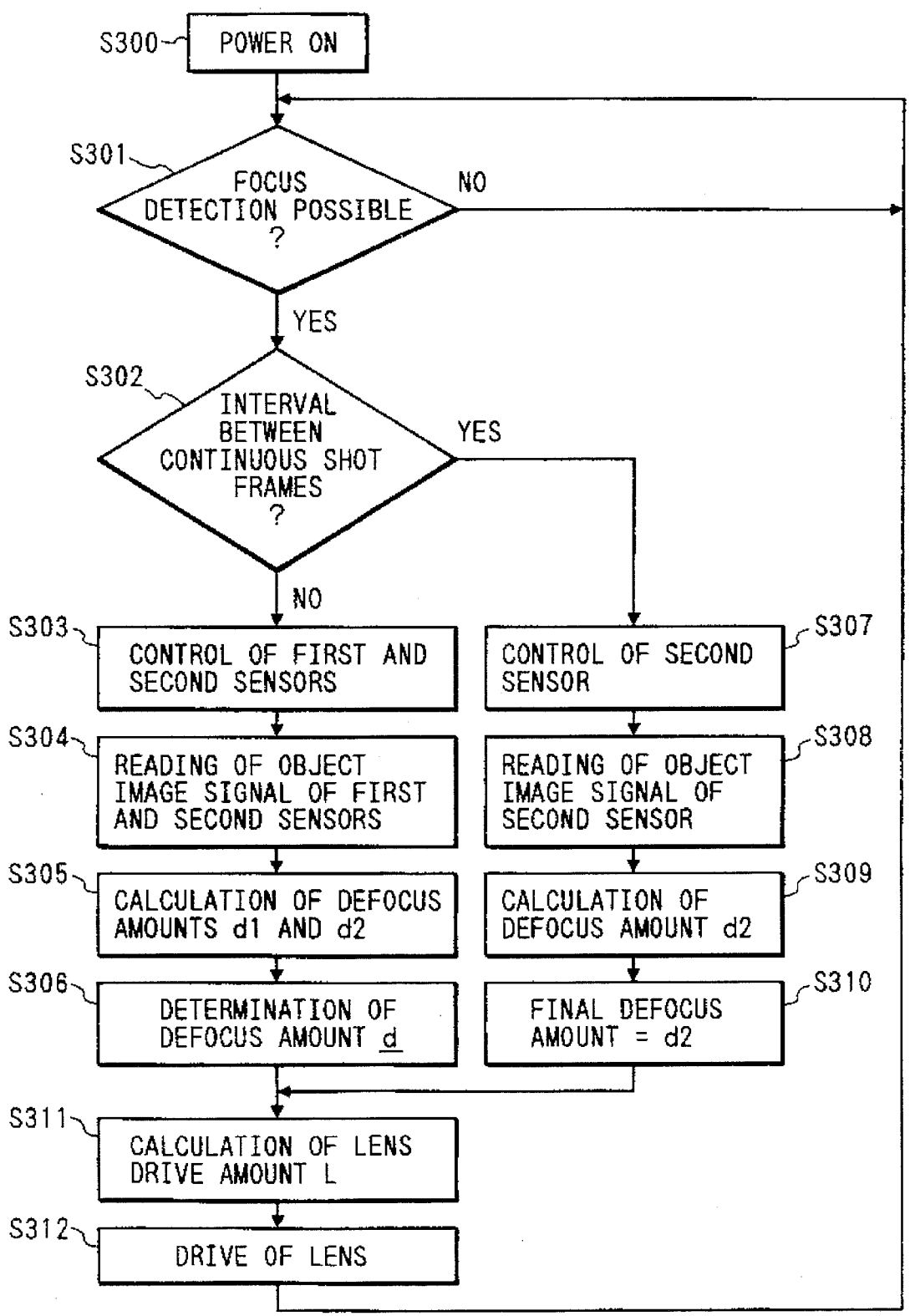
FIG. 21 is a flow chart showing an operation of a microcomputer of the embodiment shown in FIG. 19.
Figure 22:
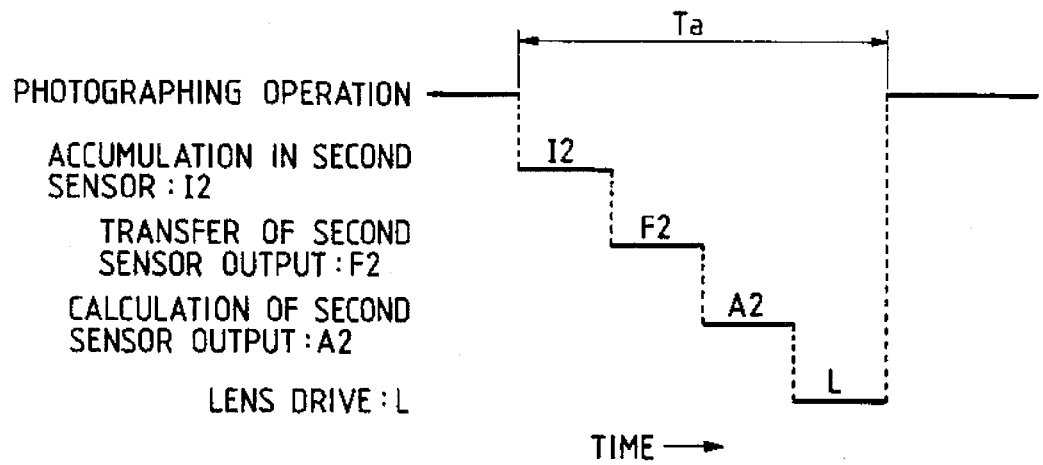
FIG. 22 is a timing chart of an AF operation for explaining a countermeasure taken by the present invention.
Figure 23:
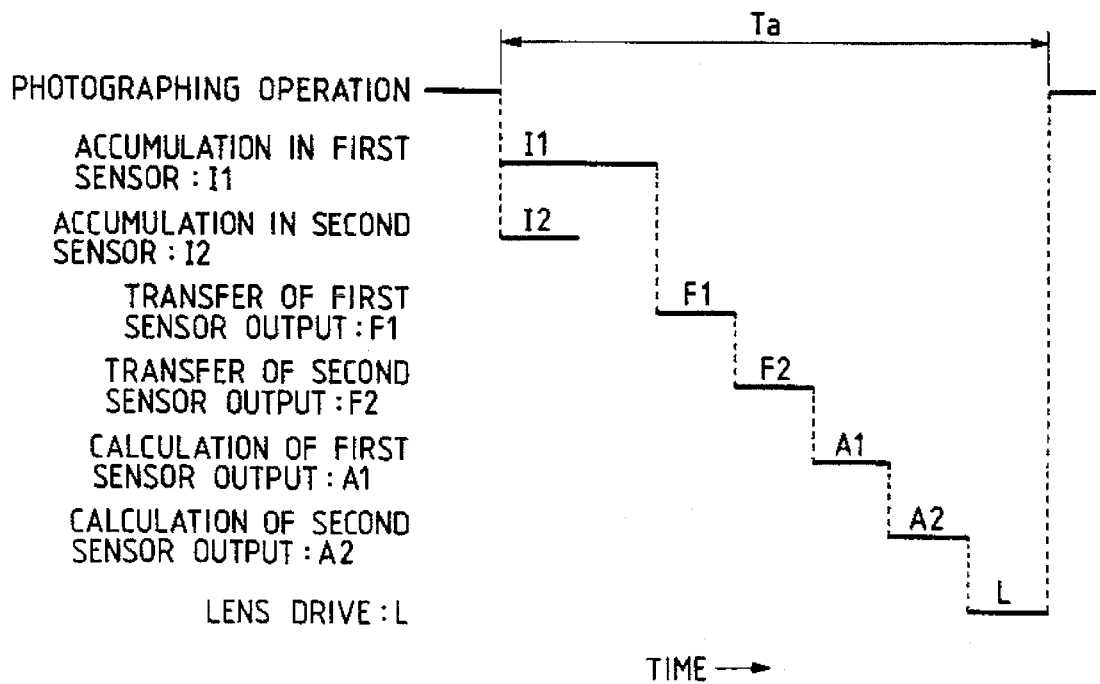
FIG. 23 is a timing chart of an AF operation for explaining problems of a conventional AF camera.

FIG. 21 is an operation flow chart of the microcomputer 1014 constituting the sensor control circuit 1011, the focus detection calculation circuit 1012, and the drive control circuit 1013 of this embodiment. The operation of this embodiment will be described below with reference to the flow chart in FIG. 21.

When a power switch of the camera is turned on in step S300, the microcomputer 1014 starts a series of processing operations, and the flow advances to step S301. In step S301, it is checked if a focus detection operation is possible. If Y (YES) in step S301, the flow advances to step S302; otherwise, the control waits in step S301 until the focus detection operation is enabled.

In step S302, it is checked, based on information from the continuous shooting device 1016, if the current timing corresponds to an interval between continuous shot frames. If Y in step S302, the second sensor 1010 is selected to shorten the AF time between frames, and the flow advances to step S307; otherwise, the flow advances to step S303.

In step S303, the first and second sensors 1009 and 1010 are selected to perform a charge accumulation operation, and the flow advances to step S304. In step S304, object image signals from the first and second sensors 1009 and 1010 are read. In step S305, the defocus amounts d1 and d2 corresponding to the focus detection areas $E_V$ and $E_H$ are calculated by processing the object image signals. In step S306, a defocus amount indicating the most far-focus state is selected from the defocus amounts d1 and d2, and is determined as a final defocus amount. Thereafter, the flow advances to step S311.

When the current timing corresponds to the interval between continuous shot frames in the continuous shooting mode, the second sensor 1010 is selected to perform a charge accumulation operation in step S307, and the flow advances to step S308. In step S308, object image signals from the second sensor 1010 are read, and in step S309, the defocus amount d2 corresponding to the focus detection area $E_H$ is calculated by processing the object image signals. In step S310, the defocus amount d2 is determined as a final defocus amount, and the flow advances to step S311.

In step S311, a lens drive amount L indicating the drive amount of the taking optical system 1003 to attain an in-focus state is calculated in accordance with the final defocus amount d. In step S312, the motor 1015 is driven to move the taking optical system 1003 by the lens drive amount L, and the flow then returns to step S301 to repeat the above-mentioned operations.

In this manner, since the focus detection operation is performed using the two focus detection areas, i.e., vertical and horizontal areas, except for the continuous shooting mode, the object pickup ability is high. Furthermore, in the continuous shooting mode, since the focus detection operation is performed by only the horizontal focus detection area, the AF time can be shortened, and a high-speed continuous shooting operation can be achieved. In addition, since an object is located at the center of the field with high possibility, even when the focus detection area to be used is limited to the horizontal area, the object pickup ability is not significantly lowered.

In each of the above embodiments, the second sensor is forcibly selected at a timing corresponding to the interval between continuous shot frames. Alternatively, a setting unit (not shown) may be separately arranged, and a photographer may select a sensor to be used at a timing corresponding to the interval between continuous shot frames. With this arrangement, since a photographer's will is reflected on the composition of a photograph, the object pickup ability is further improved.

An orientation detection unit for detecting the orientation of a camera body may be arranged, and a sensor to be used at a timing corresponding to the interval between continuous shot frames may be selected in correspondence with the orientation of the camera. With this arrangement, since the vertical focus detection area $E_V$ (FIG. 20) is selected in the vertical orientation shooting mode, a decrease in object pickup ability depending on the orientation of the camera can be prevented.

Furthermore, the number and arrangement of the focus detection areas are not limited to those in the above embodiments.

As described above, according to the present invention, when a continuous shooting operation is performed, a focus detection calculation is performed based on an output from a photoelectric conversion unit corresponding to a predetermined one of a plurality of focus detection areas; when a continuous shooting operation is not performed, a focus detection calculation is performed based on outputs from photoelectric conversion unit corresponding to all the focus detection areas. Therefore, the AF time between frames can be shortened, and a high-speed continuous shooting operation can be attained.

Since the focus detection area to be used in the continuous shooting operation is determined in advance, when the continuous shooting operation is performed in a multi AF area mode, the multi AF area mode need not be canceled to select an AF area before the continuous shooting operation.

Furthermore, since the focus detection area to be used in the continuous shooting operation is set at the center of the field where an object is located with high possibility, a high-speed continuous shooting operation is allowed without lowering the object pickup ability.

Since the detection direction of the focus detection area to be used in the continuous shooting operation is specified, a high-speed continuous shooting operation is allowed without lowering the object pickup ability.

Since a photographer can arbitrarily set a focus detection area to used in the continuous shooting operation, a photographer's will is reflected on the composition of a photograph, and the object pickup ability is improved.

An embodiment according to the third aspect of the present invention will be described below with reference to FIGS. 24 to 27.

Figure 24:
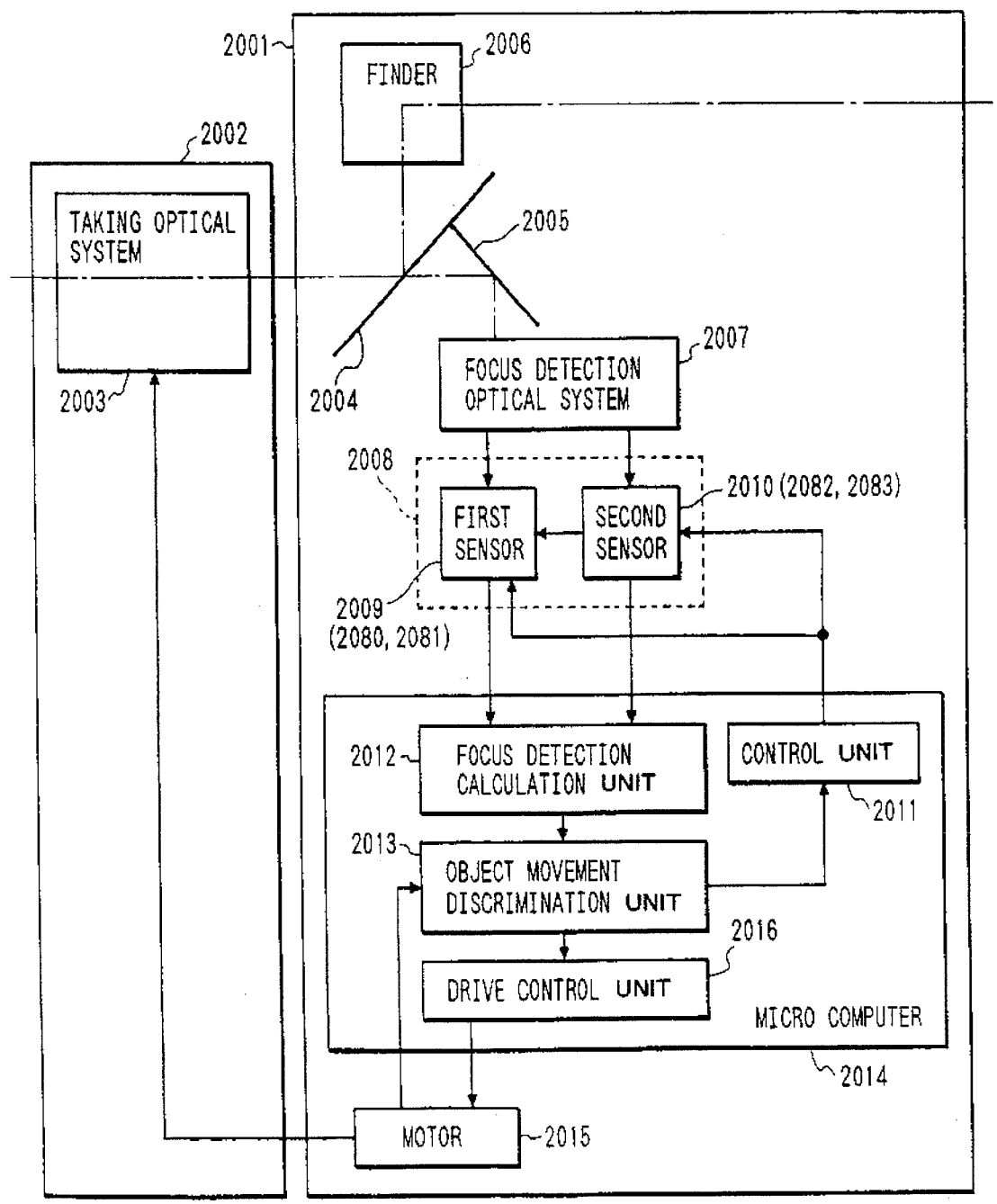
FIG. 24 is a block diagram of the first embodiment according to the third aspect of the present invention.

FIG. 24 is a block diagram of this embodiment. A lens 2002 is exchangeably mounted on a body 2001, and FIG. 24 illustrates a state wherein the lens 2002 is mounted on the body 2001. The lens 2002 comprises a taking optical system 2003. A light beam originating from an object and passing through the taking optical system 2003 is split by a main mirror 2004 comprising a half mirror in the directions of a sub mirror 2005 and a finder 2006. The light beam further deflected by the sub mirror 2005 in the bottom direction of the body 2001 (the downward direction in FIG. 24) is guided to a focus detection optical system 2007 which is arranged near the prospective focal plane of the taking optical system 2003.

Figure 25:
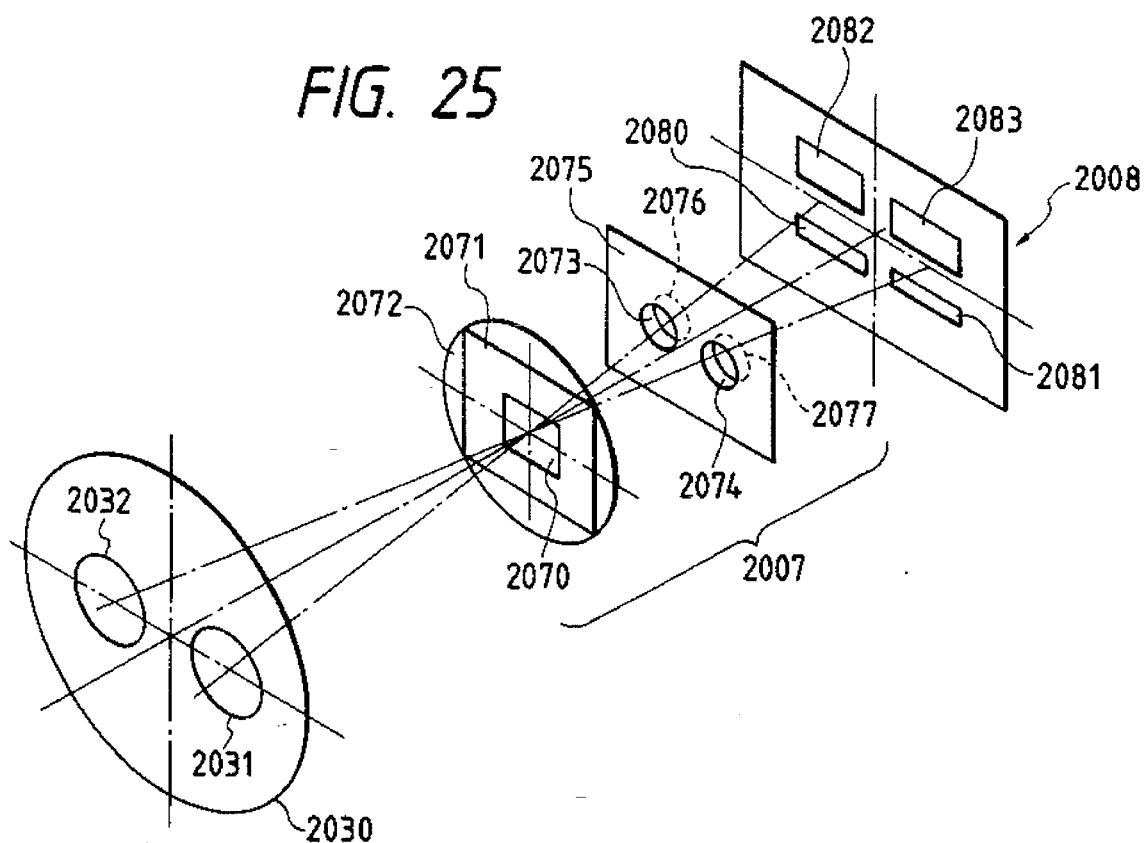
FIG. 25 is a perspective view showing an arrangement of a focus detection optical system of the embodiment shown in FIG. 24.

FIG. 25 shows a schematic arrangement of the focus detection optical system 2007 and a light-receiving element 2008 for focus detection.

The focus detection optical system 2007 comprises a field mask 2071 having an aperture portion 2070, a condenser lens 2072, a diaphragm mask 2075 having a pair of diaphragm aperture portions 2073 and 2074, and a pair of re-imaging lenses 2076 and 2077. The light-receiving element 2008 comprises a pair of light-receiving portions 2080 and 2081 aligned on the lower portion of the light-receiving element 2008, and a pair of light-receiving portions 2082 and 2083 aligned on the upper portion of the light-receiving element 2008. The light-receiving portions 2080 and 2081 constitute a first sensor 2009, and the light-receiving portions 2082 and 2083 constitute a second sensor 2010. A primary image formed at a position, near the aperture portion 2070, on the optical axis by the taking optical system 2003 (FIG. 24) is re-imaged as a pair of right and left secondary images on the light-receiving portions 2080 to 2083.

Figure 26:
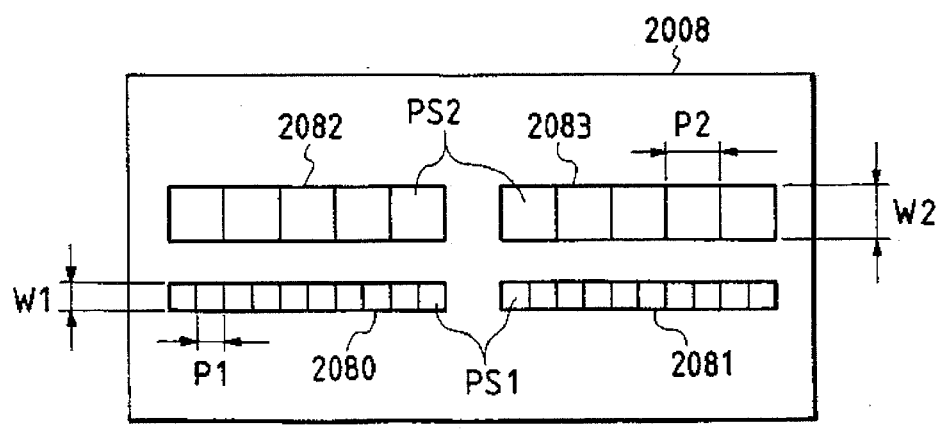
FIG. 26 is a plan view of light-receiving elements of the embodiment shown in FIG. 24.

As shown in FIG. 26, the light-receiving portions 2080 and 2081 and the light-receiving portions 2082 and 2083 respectively have a plurality of rectangular pixels PS1 and PS2 contiguous in the corresponding aligning directions, accumulate charges according to the received light amounts of these pixels PS1 and PS2, and output the charges to a microcomputer 2014 (to be described later). A pitch P1 and a height W1 of the pixel PS1 of the light-receiving portions 2080 and 2081 are set to be smaller than a pitch P2 and height W1 of the pixel PS2 of the light-receiving portions 2082 and 2083. Therefore, the pixel area P2×W2 of each of the light-receiving portions 2082 and 2083 is larger than the pixel area P1×W1 of each of the light-receiving portions 2080 and 2081, and the light-receiving portions 2082 and 2083 require a shorter charge accumulation time for obtaining a given output level than the light-receiving portions 2080 and 2081 do. More specifically, the light-receiving portions 2082 and 2083 have a higher detection sensitivity of an object image.

As shown in FIG. 25, the pair of diaphragm aperture portions 2073 and 2074 are projected onto a pair of areas 2031 and 2032, symmetrical about the optical axis, on a surface 2030 near the exit pupil of the taking optical system 2003 by the condenser lens 2072. A light beam passing through these areas 2031 and 2032 forms a primary image near the field mask 2071. The primary image formed on the aperture portion 2070 of the field mask 2071 passes through the condenser lens 2072 and the pair of diaphragm aperture portions 2073 and 2074, and is re-imaged as a pair of secondary images on the light-receiving portions 2080 and 2082 and the light-receiving portions 2081 and 2083 on the light-receiving element 2008 by the pair of re-imaging lenses 2076 and 2077. The intensity distributions of the secondary images are photoelectrically converted into electrical object image signals by the light-receiving portions 2080 to 2083. In this case, since the light-receiving portions 2080 and 2081 have a different pixel area from that of the light-receiving portions 2082 and 2083, charge accumulation times are independently set to obtain a proper output level for executing focus detection calculation processing.

As shown in FIG. 24, a pair of electrical object image signals from the first sensor 2009 and a pair of electrical object image signals form the second sensor 2010 are fetched by a focus detection calculation unit 2012 in the microcomputer 2014 under the control of a control unit 2011. The focus detection calculation unit 2012 detects a defocus amount d between the image surface and the prospective focal plane of the taking optical system 2003 by calculating the relative positional relationship among the fetched object image signals.

An object movement discrimination unit 2013 of the microcomputer 2014 stores the defocus amount calculated by the focus detection calculation unit 2012 together with its calculation time. The object movement discrimination unit 2013 monitors the rotational amount of a motor 2015 (to be described later) to measure a lens drive amount from the calculation time of the previous defocus amount to the calculation time of the current defocus amount, and converts the lens drive amount into an image surface moving amount.

If the previous defocus amount is represented by d1, its calculation time is represented by t1, the current defocus amount is represented by d2, its calculation time is represented by t2, and the image surface moving amount generated upon lens drive from time t1 to time t2 is represented by L12, the means 2013 then calculates an image surface moving speed v12 between times t1 and t2 using equation (2) above.

When the absolute value of the image surface moving speed v12 is smaller than a predetermined value V, it is determined that an object stands still, and a drive control unit 2016 included in the microcomputer 2014 is caused to control the rotational direction and amount of the motor 2015 in accordance with the current defocus amount d2. Upon rotation of the controlled motor 2015, the taking optical system 2003 is driven in the optical axis direction, so that the defocus amount d becomes zero, thus attaining an in-focus state of the taking optical system 2003.

When the absolute value of the image surface moving speed v12 is larger than the predetermined value V, it is determined that an object is moving, and a corrected defocus amount d2 is calculated using equation (3) above so as to attain an in-focus state at time t3. Then, the drive control unit 2016 is caused to control the rotational direction and amount of the motor 2015 in accordance with the corrected defocus amount d2'.

The discrimination result of the object movement discrimination unit 2013 is supplied to the control unit 2011. When an object is moving, the control unit 2011 drives the second sensor 2010 to shorten the accumulation time; when an object stands still, it drives the first sensor 2009.

Figure 27:
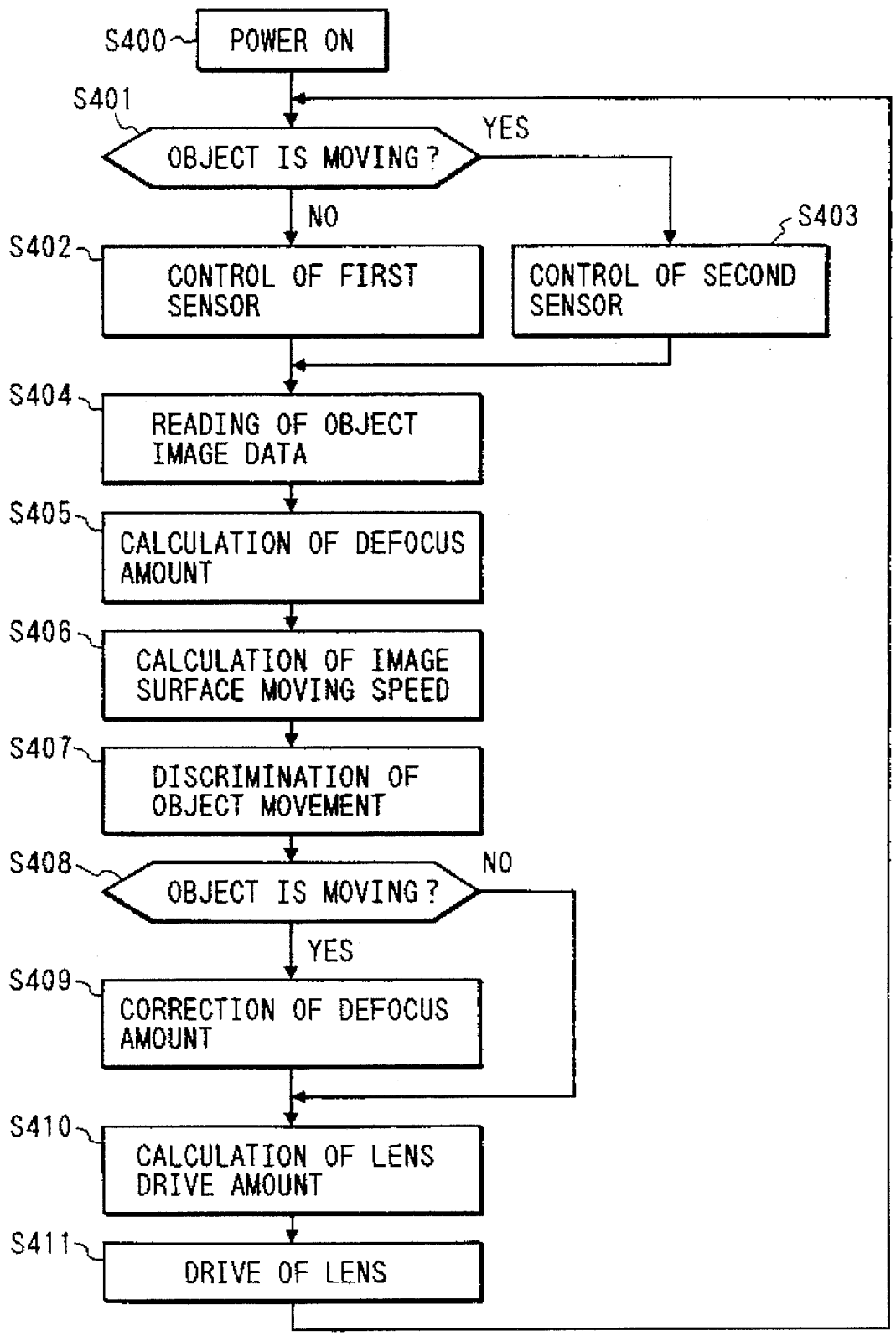
FIG. 27 is a flow chart showing an operation of the embodiment shown in FIG. 24.

FIG. 27 is an operation flow chart of the microcomputer 2014 comprising the control unit 2011, the focus detection calculation unit 2012, the object movement discrimination unit 2013, and the drive control unit 2016.

When a power switch is turned on in step S400, the flow advances to step S401.

In step S401, it is checked in accordance with the previous object movement discrimination result if an object is moving. If N (NO) in step S401, the relatively low-sensitivity first sensor 2009 is selected as a sensor to be driven, and the flow advances to step S402; otherwise, the high-sensitivity second sensor 2010 is selected as a sensor to be driven to shorten the output interval of object image signals from the light-receiving element 2008, and the flow advances to step S403. In a state immediately after the power switch is turned on or in a state wherein only one defocus amount is detected, since no previous object movement discrimination result is available, the flow unconditionally advances from step S401 to step S402 or S403.

The reason why the high-sensitivity second sensor 2010 is selected when it is determined that an object is moving is to shorten the interval between two adjacent defocus amount calculation time by shortening the charge accumulation time, so that the calculated image surface moving speed correctly reflects a change in image surface over time. The reason why the relatively low-sensitivity first sensor 2009 is selected when it is determined that an object is not moving is to improve the detection performance of a small object by the first sensor 2009 having a pixel pitch and height smaller than those of the second sensor 2010. More specifically, when a short response time is required in the detection of the image surface moving speed, the second sensor 2010 is selected while placing an importance on the response time; otherwise, the first sensor 2009 is selected while placing an importance on the small object detection performance.

In step S402, the first sensor 2009 is selected to perform a charge accumulation operation, and the flow advances to step S404. In step S403, the second sensor 2010 is selected to perform a charge accumulation operation, and the flow advances to step S404.

The charge accumulation time may be controlled by the following system. That is, light amount monitor elements are arranged near the light-receiving portions of the first and second sensors 2009 and 2010, the output from the light amount monitor elements are monitored in synchronism with the beginning of charge accumulation of these sensors 2009 and 2010, and when the monitor outputs reach a predetermined level, the charge accumulation of the sensors 2009 and 2010 is finished. In this case, since the first and second sensors 2009 and 2010 have different sensitivity levels, the predetermined level used upon driving of the first sensor 2009 is set to be different from that used upon driving of the second sensor 2010.

Alternatively, the charge accumulation control of the first or second sensor 2009 or 2010 may be performed to attain an accumulation time calculated as follows. That is, a current accumulation time is calculated in advance from the previous output level and accumulation time of the first or second sensor 2009 or 2010 before charge accumulation, so that the output level of the, first or second sensor 2009 or 2010 reaches a predetermined value.

In step S404, object image data is read from the first or second sensor 2009 or 2010. In step S405, a defocus amount is calculated by processing the read object image data. In step S406, an image surface moving speed is calculated using equation (2) based on the previous defocus amount and its calculation time, the current defocus amount and its calculation time, and the image surface moving amount generated upon lens drive from the calculation time of the previous defocus amount to the calculation time of the current defocus amount.

In step S407, the absolute value of the calculated image surface moving speed is compared with a predetermined value. When the absolute value is larger than the predetermined value, it is determined that an object is moving; otherwise, it is determined that an object is not moving. If it is determined in step S408 that an object is moving, the flow advances to step S409; otherwise, the flow advances to step S410. In step S409, the current defocus amount is corrected based on equation (3) to attain an in-focus state with respect to the moving object after an elapse of a predetermined period of time. In step S410, a lens drive amount for attaining an in-focus state of the taking optical system 2003 is calculated in accordance with the current defocus amount or the corrected defocus amount. Since a state immediately after the power switch is turned on has no previous defocus amount, the flow unconditionally advances from step S405 to S410 skipping steps S406, S407, S408, and S409. In step S411, the motor 2015 is driven to move the taking optical system 2003 by the calculated lens drive amount. Thereafter, the flow returns to step S401 to repeat the above-mentioned operations.

With the above-mentioned processing, when it is determined that an object is moving, the second sensor 2010 having a high detection sensitivity of an object image is preferentially driven, and the defocus amount or the correction amount is calculated on the basis of the output from the second sensor. For this reason, the calculation period of the focusing amount can be shortened, and the response time of predictive drive control especially in a low-luminance state can be greatly shortened. When it is determined that an object is not moving, a small object is detected by the first sensor 2009, and high focus detection precision can be obtained.

In the above embodiment, when it is determined that an object is moving, the second sensor 2010 is selected. Furthermore, an object luminance condition may be added. That is, when it is determined that an object is moving, and when the object luminance is so lowered as to undesirably prolong the charge accumulation time, the second sensor 2010 may be selected.

In the above embodiment, when it is determined that an object is moving, only the second sensor 2010 is driven. However, the two sensors 2009 and 2010 may be driven all the time, and the output from either one of these sensors may be fetched by the microcomputer 2014 in accordance with the object movement discrimination result. Alternatively, the outputs from both the sensors 2009 and 2010 may be fetched by the microcomputer 2014 all the time, and the output signal from either one of the sensors may be selected as calculation information of the defocus amount in accordance with the object movement discrimination result. That is, it is important that the output from the second sensor 2010 is selected as an output from the light-receiving element 2008 used in the calculation of the defocus amount or its correction amount when it is determined that an object is moving.

Figure 28A:
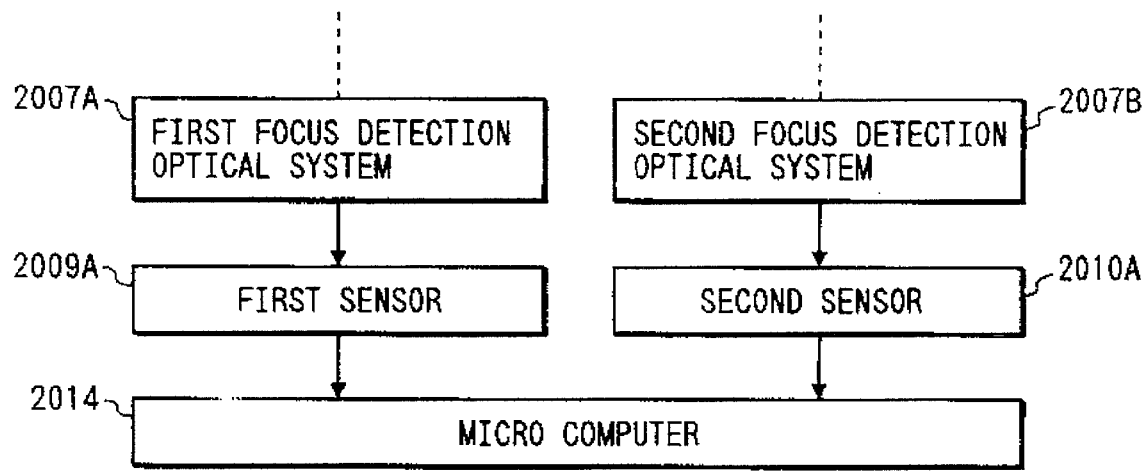
Figure 28B:
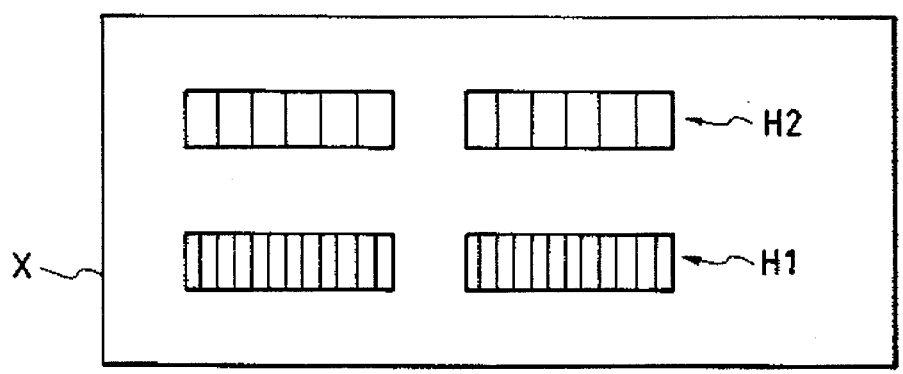

In the above embodiment, the detection sensitivity of an object image is varied in accordance with the pixel areas of the sensors 2009 and 2010. Alternatively, in order to vary the sensitivity, focus detection optical systems may be arranged in correspondence with the sensors, and their re-imaging magnifications may be changed. FIGS. 28A and 28B show this example.

In the example shown in FIG. 28A, an object image is formed on a first sensor 2009A by a first focus detection optical system 2007A, and an object image is formed on a second sensor 2010A by a second focus detection optical system 2007B. The re-imaging magnifications of the object images by the focus detection optical systems 2007A and 2007B are set to have different values. As shown in FIG. 28B, the pixel area of a projected image H2 of the second sensor 2010A on a primary image surface X (almost equal to the position of the field mask 2071) on the object space side of the focus detection optical systems 2007A and 2007B is larger than that of a projected image H1 of the first sensor 2009A. Thus, the object image detection sensitivity of the second sensor 2010A becomes higher than that of the first sensor 2009A. In this example, the pixel areas of the projected images H1 and H2 on the primary image surface X serve as selection indices of the sensors 2009A and 2010A irrespective of the actual pixel areas of the sensors 2009A and 2010A themselves.

Another embodiment according to the third aspect of the present invention will be described below with reference to FIGS. 29 and 30. Note that the same reference numerals in this embodiment denote the same parts as in FIGS. 24 to 27, and a detailed description thereof will be omitted.

Figure 29:
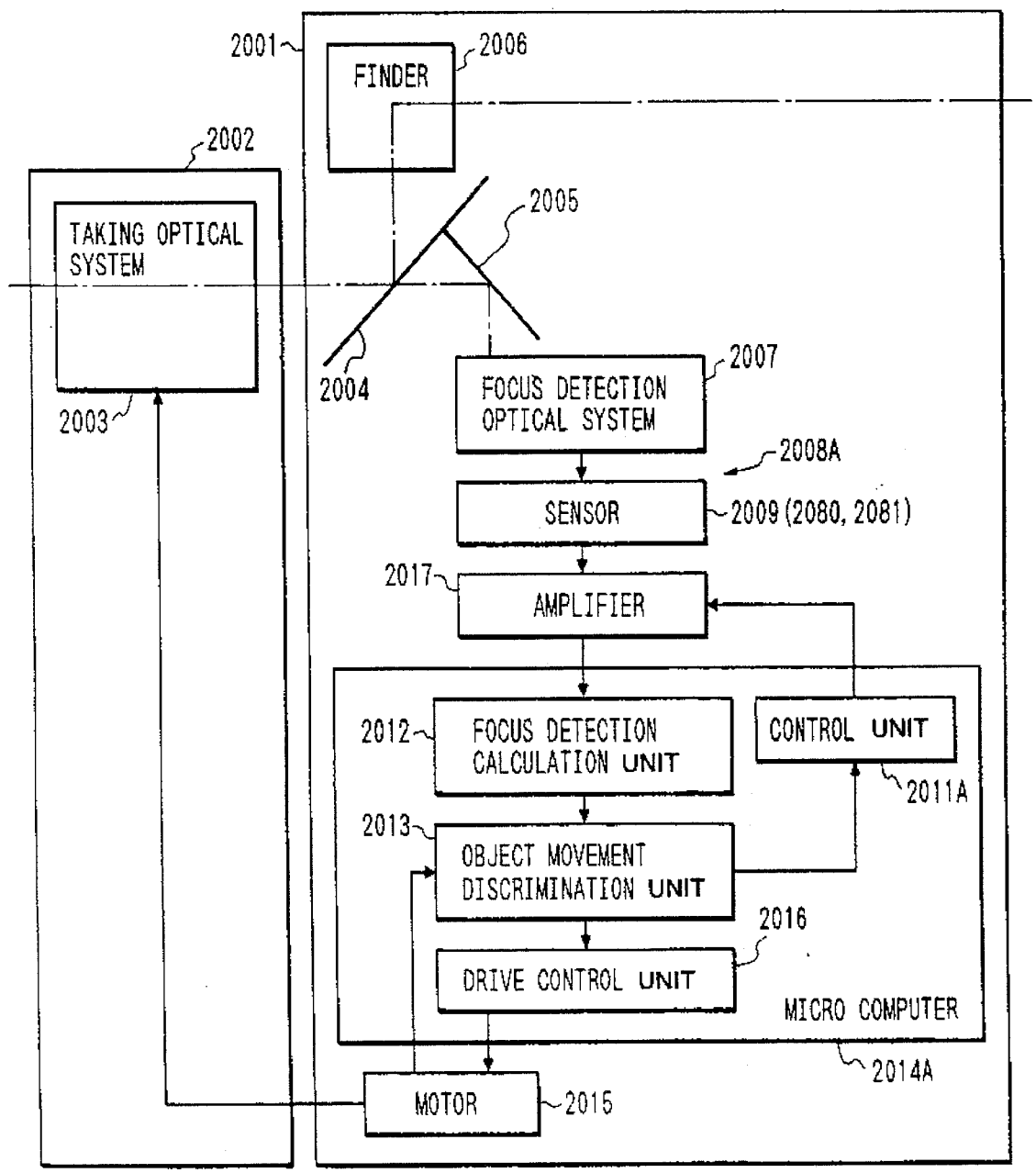
FIG. 29 is a block diagram showing the second embodiment according to the third aspect of the present invention.

FIG. 29 is a block diagram of this embodiment. A difference between this embodiment and the first embodiment according to the third aspect of the present invention is that a light-receiving element 2008A comprises a single charge accumulation type sensor 2009, and an amplifier 2017 for amplifying a pair of object image signal outputs from the sensor 2009 is added between the sensor 2009 and the focus detection calculation unit 2012. The arrangement of the focus detection optical system 2007 is the same as that shown in FIG. 25, and the sensor 2009 comprises a pair of light-receiving portions 2080 and 2081.

The amplifier 2017 has a first gain and a second gain higher than the first gain, and selects one of the first and second gains on the basis of a control signal from a control unit 2011A. The discrimination result of the object movement discrimination unit 2013 is supplied to the control unit 2011A. When it is determined that an object is moving, the control unit 2011A operates the amplifier 2017 with the second gain (high gain) to shorten the accumulation time of the sensor 2009; when it is determined that an object stands still, the means 2011A operates the amplifier 2017 with the first gain (low gain).

FIG. 29 is an operation flow chart of a microcomputer 2014A comprising the control unit 2011A, the focus detection calculation unit 2012, the object movement discrimination unit 2013, and the drive control unit 2016.

When a power switch is turned on in step S500, the flow advances to step S501.

In step S501, it is checked in accordance with the previous object movement discrimination result if an object is moving. If N (NO) in step S501, the first gain of the amplifier 2017 is selected in step S502; otherwise, the second gain of the amplifier 2017 is selected to shorten the accumulation time of the sensor in step S504. In a state immediately after the power switch is turned on or in a state wherein only one defocus amount is detected, since no previous object movement discrimination result is available, the flow unconditionally advances from step S501 to step S502 or S504.

The reason why the high gain is selected when it is determined that an object is moving is to shorten the interval between two adjacent defocus amount calculation times by shortening the charge accumulation time, so that the calculated image surface moving speed correctly reflects a change in image surface over time. The reason why the low gain is selected when it is determined that an object is not moving is to increase the output level of the object image signals from the sensor 2009 as much as possible, thereby increasing the S/N ratio. More specifically, when a short response time is required in the detection of the image surface moving speed, the high gain is selected while placing an importance on the response time; otherwise, the low gain is selected while placing an importance on obtaining a high S/N ratio of the object image signals.

In step S503, the charge accumulation time is determined, so that object image signals have a level suitable for a focus detection calculation when the object image signals are amplified with the first gain, and the sensor 2009 performs a charge accumulation operation in accordance with the calculated time. Then, the flow advances to step S506. In step S505, the charge accumulation time (shorter than the charge accumulation time determined in step S503) is determined, so that object image signals have a level suitable for a focus detection calculation when the object image signals are amplified with the second gain, and the sensor 2009 performs a charge accumulation operation in accordance with the calculated time. Thereafter, the flow advances to step S506.

The charge accumulation time may be controlled by the following system. That is, light amount monitor elements are arranged near the light-receiving portions of the sensor 2009, the outputs from the light amount monitor elements are monitored starting from the beginning of charge accumulation of the sensor 2009, and when the monitor outputs reach a predetermined level, the charge accumulation of the sensor 2009 is finished. In this case, the predetermined level upon amplification with the first gain is set to be different from that upon amplification with the second gain.

Alternatively, the charge accumulation control of the sensor 2009 may be performed to attain an accumulation time calculated as follows. That is, a current accumulation time A0 is calculated in advance using equation (5) below on the basis of a previous output level Q1, accumulation time A1, and gain G1 of the sensor 2009, and a currently selected gain G0 before charge accumulation, so that the current output level of the sensor 2009 reaches a predetermined value Q0.

$$A0 = (A1 \times Q0 \times G1)/(Q1 \times G0) \tag{5}$$

In step S506, object image data is read from the amplifier 2017. In step S507, a defocus amount is calculated by processing object image data. In step S508, an image surface moving speed is calculated using equation (2) based on the previous defocus amount and its calculation time, the current defocus amount and its calculation time, and the image surface moving amount generated upon lens drive from the calculation time of the previous defocus amount to the calculation time of the current defocus amount.

In step S509, the absolute value of the calculated image surface moving speed is compared with a predetermined value. When the absolute value is larger than the predetermined value, it is determined that an object is moving; otherwise, it is determined that an object is not moving. If it is determined in step S510 that an object is moving, the flow advances to step S511; otherwise, the flow advances to step S512. In step S511, the current defocus amount is corrected based on equation (3) to attain an in-focus state with respect to the moving object after an elapse of a predetermined period of time. In step S512, a lens drive amount for attaining an in-focus state of the taking optical system 2003 is calculated in accordance with the current defocus amount or the corrected defocus amount. Since a state immediate after the power switch is turned on has no previous defocus amount, the flow unconditionally advances from step S507 to S512, skipping steps S508, S509, S510, and S511. In step S513, the motor 2015 is driven to move the taking optical system 2003 by the calculated lens drive amount. Thereafter, the flow returns to step S501 to repeat the above-mentioned operations.

With the above-mentioned processing, when it is determined that an object is moving, the second gain as a higher gain of the amplifier 2017 is set. For this reason, the calculation period of the focusing amount can be shortened, and the response time of predictive drive control especially in a low-luminance state can be greatly shortened. When it is determined that an object is not moving, the lower gain of the amplifier 2017 is set. For this reason, the S/N ratio of the object image signals is improved, and high focus detection precision can be obtained.

In this embodiment, when it is determined that an object is moving, the second gain is selected. Furthermore, an object luminance condition may be added. That is, when it is determined that an object is moving, and when the object luminance is so lowered as to undesirably prolong the charge accumulation time, the second gain may be selected.

Still another embodiment according to the third aspect of the present invention will be described below with reference to FIGS. 31 to 33. The same reference numerals in this embodiment denote parts common to the above-mentioned two embodiments, and a detailed description thereof will be omitted.

Figure 31:
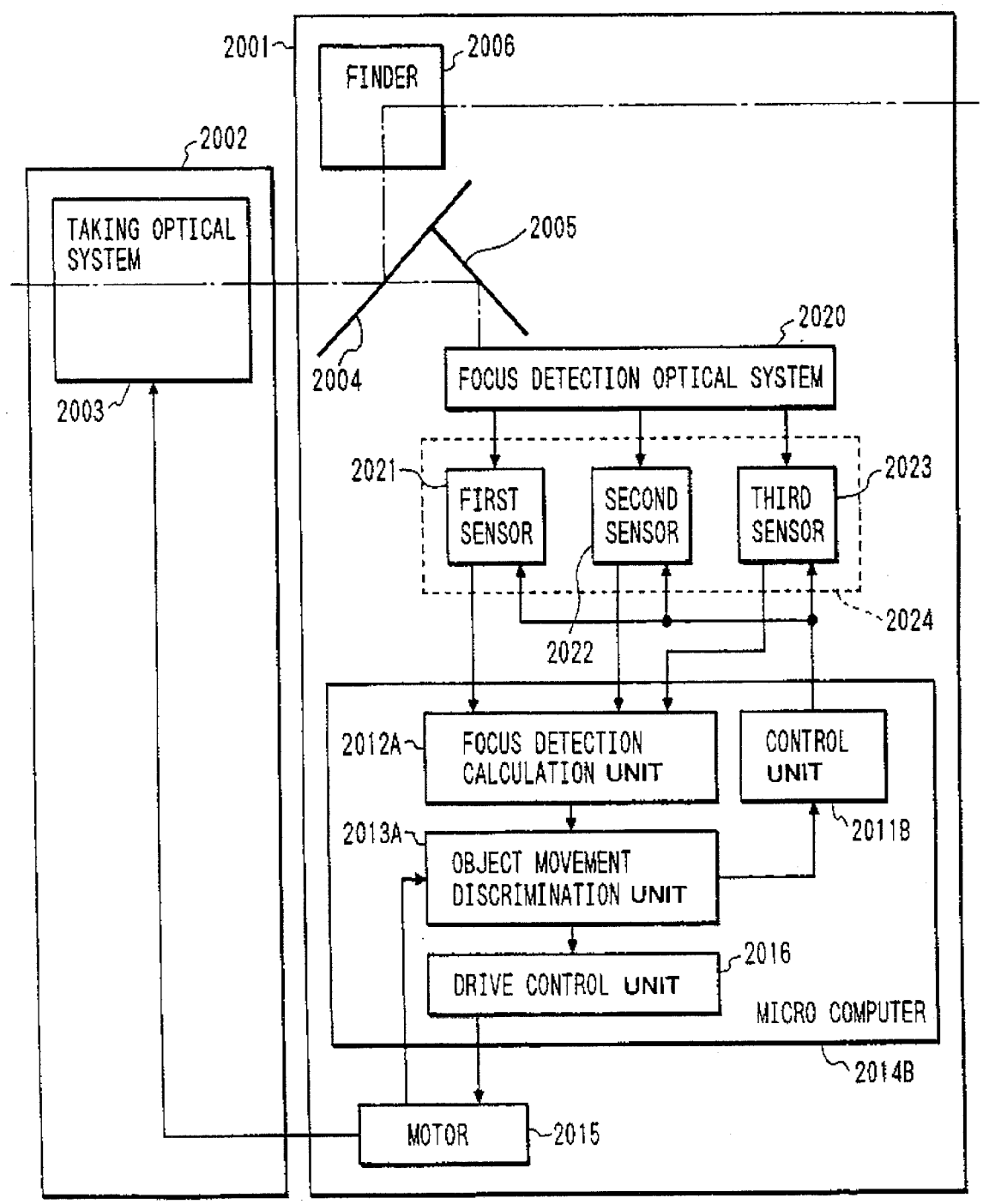
FIG. 31 is a block diagram showing the third embodiment according to the third aspect of the present invention.

FIG. 31 is a block diagram of this embodiment. In this embodiment, a light beam emerging from a focus detection optical system 2020 is guided to a light-receiving element 2024 comprising three charge accumulation type sensors, i.e., a first sensor 2021, a second sensor 2022, and a third sensor 2023.

Figure 32:
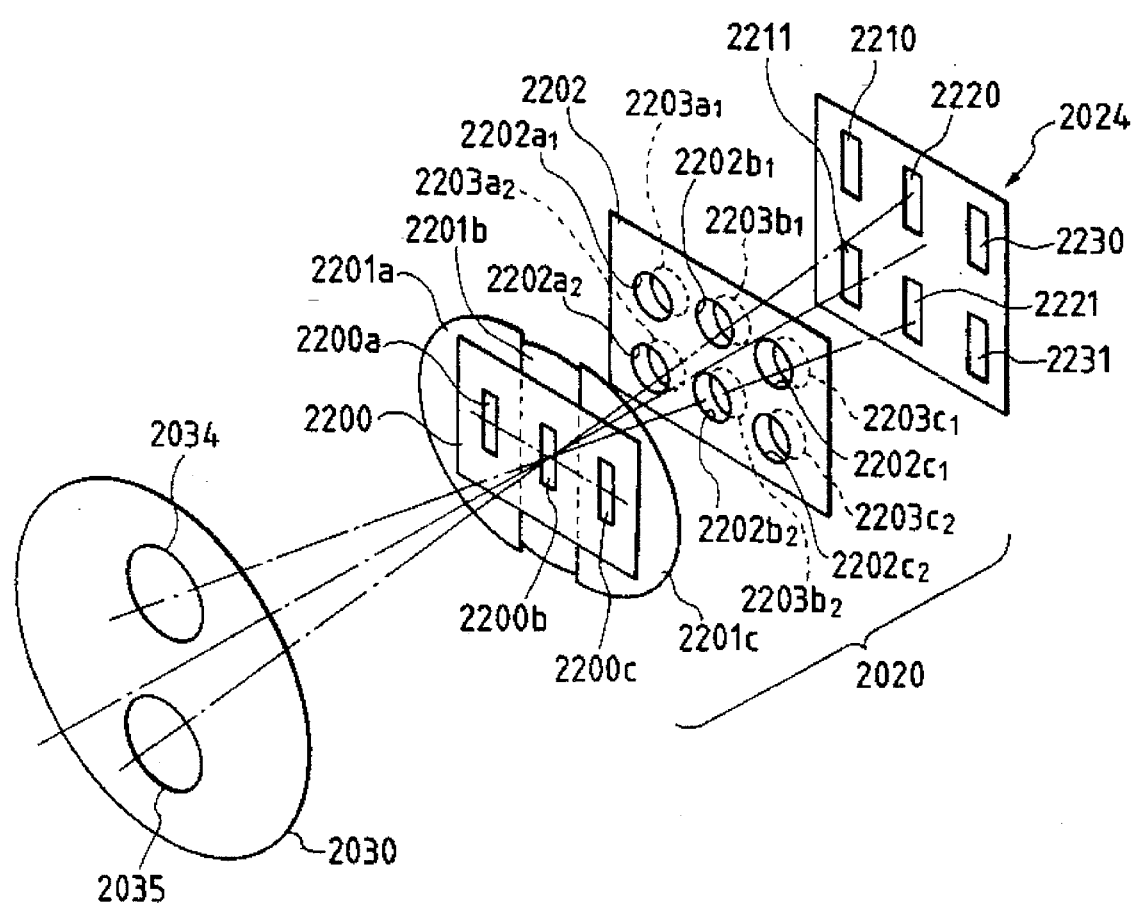
FIG. 32 is a perspective view showing an arrangement of a focus detection optical system of the embodiment shown in FIG. 31.

FIG. 32 shows the arrangement of the focus detection optical system 2020 and the light-receiving element 2024.

The focus detection optical system 2020 has three re-imaging optical systems corresponding to three focus detection areas, i.e., central, right, and left areas on a taking field defined by the taking optical system 2003. More specifically, the focus detection optical system 2020 comprises a field mask 2200 having aperture portions 2200*a* to 2200*c*, three condenser lenses 2201*a* to 2201*c* corresponding to the aperture portions 2200*a* to 2200*c*, a diaphragm mask 2202 having three pairs of upper and lower diaphragm aperture portions 2202*a*1, 2202*a*2, 2202*b*1, 2202*b*1, 2202*c*1, and 2202*c*2, and three pairs of re-imaging lenses 2203*a*1, 2203*a*2, 2203*b*1, 2203*b*2, 2203*c*1, and. 2203*c*2 arranged in correspondence with the diaphragm aperture portions.

The light-receiving element 2024 comprises three pairs of upper and lower light-receiving portions 2210, 2211, 2220, 2221, 2230, and 2231. The left light-receiving portions 2210 and 2211 in FIG. 32 constitute the first sensor 2021, the central light-receiving portions 2220 and 2221 constitute the second sensor 2022, and the right light-receiving portions 2230 and 2231 constitute the third sensor 2023. In each of these light-receiving portions, pixels for accumulating a charge in accordance with the received light amount are linearly aligned in the aligning direction (in the vertical direction in FIG. 32) of the paired light-receiving portions, as in the arrangement shown in FIG. 25.

A primary image formed at a position near the aperture portion 2200*b* on the optical axis by the taking optical system 2203 is re-imaged as a pair of secondary images on the light-receiving portions 2220 and 2221, a primary image formed near the aperture portion 2200*a* is re-imaged as a pair of secondary images on the light-receiving portions 2210 and 2211, and a primary image formed near the aperture portion 2200*c* is re-imaged as a pair of secondary images on the light-receiving portions 2230 and 2231.

The three paints of diaphragm aperture portions 2202*a*1, 2202*a*2, 2202*b*1, 2202*b*2, 2202*c*1, and 2202*c*2 are projected on a pair of areas 2034 and 2035, symmetrical about the optical axis, on a surface 2030 near the exit pupil of the taking optical system 2003 by the condenser lenses 2201*a* to 2201*c*. A light beam passing through these areas 2034 and 2035 forms a primary image near the field mask 2200.

The primary image formed on the aperture portion 2200*b* of the field mask 2200 passes through the condenser lens 2201*b* and the pair of diaphragm aperture portions 2202*b*1 and 2202*b*2, and is re-imaged as a pair of secondary images on the light-receiving portions 2220 and 2221 on the light-receiving element 2024 by the pair of re-imaging lenses 2203*b*1 and 2203*b*2.

The primary image formed on the aperture portion 2200*a* of the field mask 2200 passes through the condenser lens 2201*a* and the pair of diaphragm aperture portions 2202*a*1 and 2202*a*2, and is re-imaged as a pair of secondary images on the light-receiving portions 2210 and 2211 on the light-receiving element 2024 by the pair of re-imaging lenses 2203*a*1 and 2203*a*2.

The primary image formed on the aperture portion 2200*c* of the field mask 2200 passes through the condenser lens 2201*c* and the pair of diaphragm aperture portions 2202*c*1 and 2202*c*2, and is re-imaged as a pair of secondary images on the light-receiving portions 2230 and 2231 on the light-receiving element 2024 by the pair of re-imaging lenses 2203*c*1 and 2203*c*2.

The intensity distributions of the three pairs of secondary images are photoelectrically converted into electrical object image signals by the light-receiving portions 2220, 2221, 2210, 2211, 2230, and 2231.

As shown in FIG. 31, the discrimination result from an object movement discrimination unit 2013A is supplied to a control unit 2011B, and the control unit 2011B controls the output operations of the first to third sensors 2021 to 2023 in accordance with the discrimination result. More specifically, when it is determined that an object is moving, only the sensor which is picking up a moving object is operated to shorten the transfer time of the object image signals, and the focus detection calculation time; when it is determined that an object stands still, all the sensors 2021 to 2023 are operated.

When all the sensors 2021 to 2023 of the light-receiving element 2024 output object image signals, a focus detection calculation unit 2012A individually calculates defocus amounts corresponding to the output signals from the sensors 2021 to 2023, and outputs these amounts to the object movement discrimination unit 2013A; when one of these sensors outputs object image signals, the unit 2012A calculates only a defocus amount corresponding to the output signals, and outputs the amount to the object movement discrimination 2013A.

The object movement discrimination unit 2013A calculates a moving speed v12 of the object image surface using equation (2) as in the first embodiment according to the third aspect of the present invention, and discriminates whether or not an object is moving. In this case, upon reception of the defocus amounts corresponding to the three focus detection areas from the focus detection calculation unit 2012A, the object movement discrimination unit 2013A calculates image surface moving speeds v12 on the respective focus detection areas, determines the focus detection area having the highest moving speed as a detection position of a principal object, and discriminates the presence/absence of a moving object based on the moving speed on the determined area. When the moving object is determined, the object movement discrimination unit 2013A calculates a corrected defocus amount d2' by substituting the defocus amount of the focus detection area determined as the position of the principal object and the calculated image surface moving speed v12 in equation (3). Information associated with the focus detection area determined as the position of the principal object is output to the control unit 2011B, and is used in the above-mentioned selection of the sensors 2021 to 2023.

Figure 33:
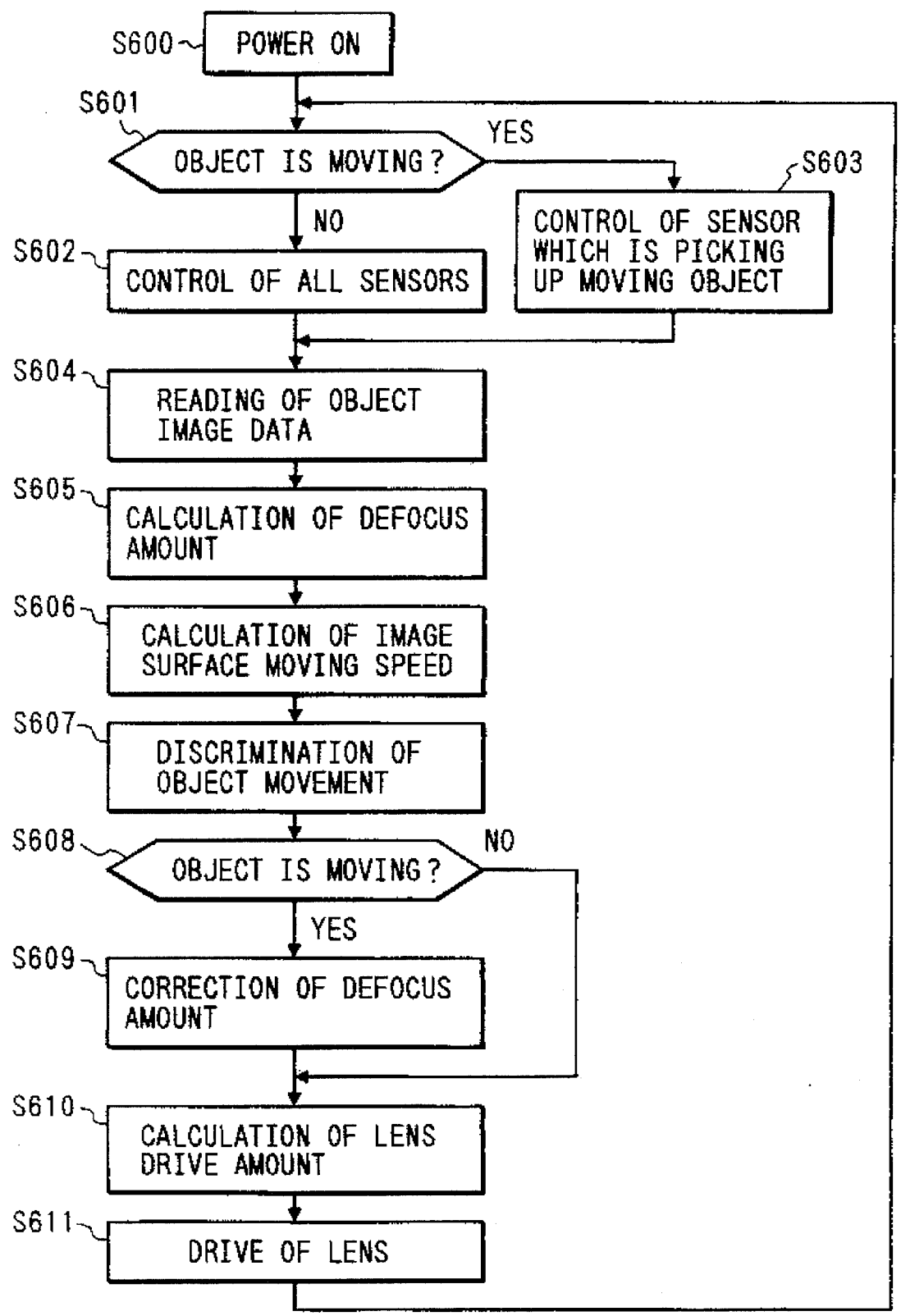
FIG. 33 is a flow chart showing an operation of the embodiment shown in FIG. 31.

FIG. 33 is an operation flow chart of a microcomputer 2014B comprising a control unit 2011A, the focus detection calculation unit 2012A, the object movement discrimination unit 2013A, and a drive control unit 2016.

When a power switch is turned on in step S600, the flow advances to step S601.

In step S601, it is checked in accordance with the previous object movement discrimination result if an object is moving. If N (NO) in step S601, all the sensors 2021 to 2023 are selected as sensors to be driven to perform charge accumulation in step S602. However, if Y (YES) in step S601, only the sensor which is picking up a moving object is selected as a sensor to be driven to perform charge accumulation in step S603, thereby shortening the focus detection calculation time. In a state immediately after the power switch is turned on or in a state wherein only one defocus amount is detected, since no previous object movement discrimination result is available, the flow unconditionally advances from step S601 to step S602.

The reason why a sensor which is picking up a moving object is selected when it is determined that the object is moving is to shorten the transfer time of object image signals and the focus detection calculation time by decreasing the amount of data used in the focus detection calculation later, and to finally shorten the interval between the defocus amount calculation times, so that the calculated image surface moving speed correctly reflects a change in image surface over time.

On the other hand, the reason why charge accumulation of all the sensors 2021 to 2023 is to be performed when it is determined that an object is not moving is to perform focus detection at a plurality of positions in the field when a short response time is not required, and to reliably pick up a principal object by obtaining the final result based on the plurality of focus detection results. More specifically, when a short response time is required in the detection of the image surface moving speed, only a sensor which is picking up a moving object is operated while placing an importance on the response time; when a short response time is not required, all the sensors are operated to reliably pick up a principal object.

In step S604, object image data is read from all the sensors 2021 to 2023 or a sensor which is picking up a moving object. In step S605, a defocus amount is calculated by processing the object image data. In step S606, an image surface moving speed is calculated using equation (2) on the basis of the previous defocus amount and its calculation time, the current defocus amount and its calculation time, and the image surface moving amount generated upon lens drive from the calculation time of the previous defocus amount to the calculation time of the current defocus amount.

In this case, when charge accumulation of all the sensors 2021 to 2023 is performed, as described above, three image surface moving speeds corresponding to the first, second, and third sensors are calculated, and the highest one of these speeds is used as information for discriminating the presence/absence of object movement (to be described later). Also, the sensor corresponding to the maximum image surface moving speed is determined to be a sensor which is picking up a moving object.

In step S607, the absolute value of the calculated image surface moving speed is compared with a predetermined value. When the absolute value is larger than the predetermined value, it is determined that an object is moving; otherwise, it is determined that an object is not moving. If it is determined in step S608 that an object is moving, the flow advances to step S609; otherwise, the flow advances to step S610.

In step S609, the current defocus amount is corrected based on equation (3) to attain an in-focus state with respect to the moving object after an elapse of a predetermined period of time. In step S610, a lens drive amount for attaining an in-focus state of the taking optical system 2003 is calculated in accordance with the current defocus amount or the corrected defocus amount. Since a state immediate after the power switch is turned on has no previous defocus amount, the flow unconditionally advances from step S605 to step S610 skipping steps S606, S607, S608, and S609. In step S611, the motor 2015 is driven to move the taking optical system 2003 by the calculated lens drive amount. Thereafter, the flow returns to step S601 to repeat the above-mentioned operations.

With the above-mentioned processing, when it is determined that an object is moving, only a sensor which is picking up a moving object is driven, and the defocus amount or its correction amount is calculated based on the outputs from the driven sensor. For this reason, the calculation period of focusing amounts can be shortened by shortening the time required for calculation processing in predictive drive control, and the response time of predictive drive control can be greatly shortened. When it is determined that an object is not moving, a principal object is specified based on the outputs from all the sensors 2021 to 2023, and focusing is performed, thus obtaining high focus detection precision.

In the above embodiment, when it is determined that an object is moving, only a sensor, which is picking up a moving object, is selected from the three sensors 2021 to 2023. Alternatively, object movement may be discriminated using only the second sensor 2022 used in focus detection at the center of the field, and when it is determined that an object is moving, only the second sensor 2022 may be driven; when it is determined that an object stands still, all the sensors 2021 to 2023 may be driven.

In the above embodiment, when it is determined that an object is moving, only a sensor, which is picking up a moving object, is selected from the three sensors 2021 to 2023. Alternatively, when focus detection is performed using two sensors corresponding to a cross-shaped focus detection area, either one of the two sensors may be driven when it is determined that an object is moving.

Figure 34:
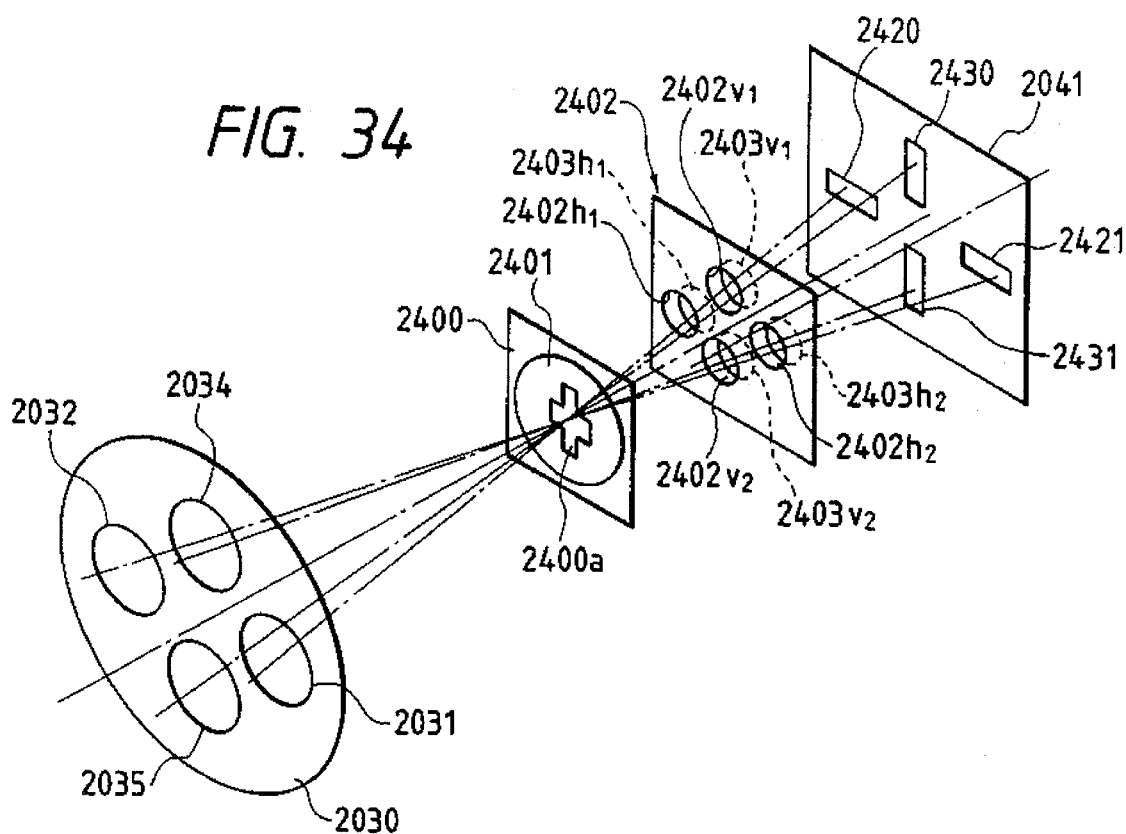
FIG. 34 is a perspective view showing a modification of the focus detection optical system of the embodiment shown in FIG. 31.
Figure 35:
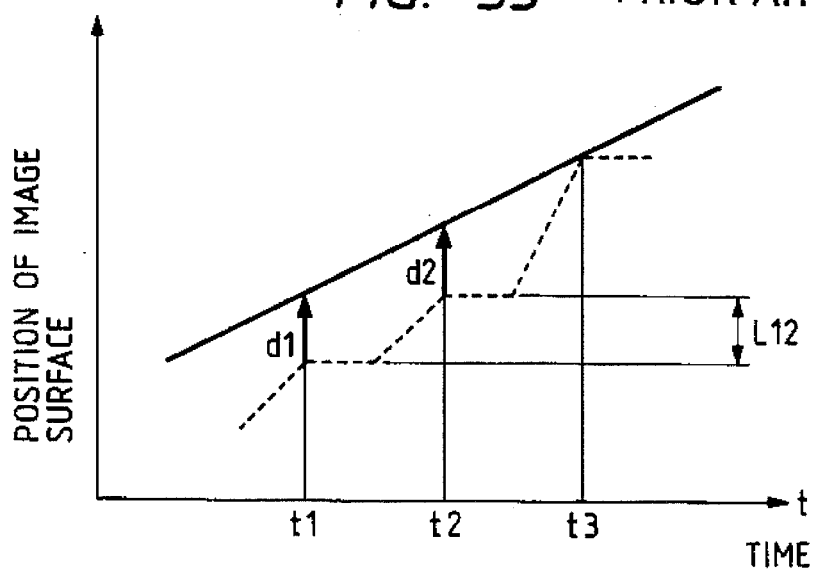
FIG. 35 is an explanatory view of the basic principle of predictive drive control.

FIG. 34 shows the arrangement of a focus detection optical system 2040 and a light-receiving element 2041 upon execution of focus detection based on a cross-shaped focus detection area.

The focus detection optical system 2040 comprises a field mask 2400 having a cross-shaped aperture portion 2400a, a condenser lens 2401, a diaphragm mask 2402 having two pairs of upper and lower, and right and left diaphragm aperture portions $2402h1$, $2402h2$, $2402v1$, and $2402v2$, and re-imaging lenses $2403h1$, $2403h2$, $2403v1$, and $2403v2$ corresponding to these diaphragm aperture portions. The light-receiving element 2041 comprises a pair of light-receiving portions 2420 and 2421 aligned in the horizontal direction, and a pair of light-receiving portions 2430 and 2431 aligned in the vertical direction. The light-receiving portions 2420 and 2421 constitute a first sensor 2042, and the light-receiving portions 2430 and 2431 constitute a second sensor 2043. A primary image formed at a position near the aperture portion on the optical axis by the taking optical system 2003 is re-imaged as two pairs of secondary images on the light-receiving portions.

One pair of diaphragm aperture portions $2402h1$ and $2402h2$ aligned in the horizontal direction are projected onto a pair of areas 2031 and 2032, symmetrical about the optical axis, on a surface 2030 near the exit pupil of the taking optical system 2003 by the condenser lens 2401, as shown in FIG. 34, and the other pair of diaphragm aperture portions $2402v1$ and $2402v2$ are projected onto a pair of areas 2034 and 2035, symmetrical about the optical axis, on the surface 2030 near the exit pupil of the taking optical system 2003 by the condenser lens 2401.

A light beam passing through these areas forms a primary image near the field mask 2400. The primary image formed on the aperture portion 2400a of the field mask 2400 passes through the condenser lens 2401 and the diaphragm aperture portions $2402h1$, $2402h2$, $2402v1$, and $2402v2$, and is re-imaged as a total of two pairs of upper and lower, and right and left primary images on the light-receiving portions 2420, 2421, 2430, and 2431 of the light-receiving element 2041 by the re-imaging lenses $2403h1$, $2403h2$, $2403v1$, and $2403v2$. The intensity distributions of these secondary images are photoelectrically converted into electrical object image signals by the light-receiving portions 2420, 2421, 2430, and 2431.

In the arrangement shown in FIG. 34 as well, when it is determined that an object is moving, the first or second sensor 2042 or 2043 which is picking up a moving object is driven; when it is determined that an object is not moving, both the first and second sensors 2042 and 2043 are driven, thus obtaining the same effect as in the embodiment shown in FIGS. 31 to 33.

In the above embodiment, a sensor which is picking up a moving object is selected from a plurality of sensors when it is determined that an object is moving. Alternatively, when it is determined that an object is moving, only a specific sensor (e.g., a sensor for performing focus detection at the center of the field) may be driven. Also, a sensor, which has a relatively short accumulation time, of a plurality of sensors, i.e., a sensor which detects a high-luminance object, may be selectively driven. In this case, when the distance to an object is small, and all of the plurality of detection areas pick up a moving object, the charge accumulation time is shortened, and the response time for predictive drive control can be shortened.

In the above embodiment, the sensor is selected independently of the object luminance. However, when the response time of predictive drive control at the high luminance side does not pose any problem, and a decrease in response time due to an increase in charge accumulation time at the low luminance side poses a problem, the sensor may be selected in only a low-luminance state, and the increase in charge accumulation time may be canceled by a decrease in calculation processing time.

Even when focus detection is performed using a single sensor, when an object is moving, the focus detection area may be reduced in size to shorten the response time so as to shorten the focus detection calculation time.

Figure 30:
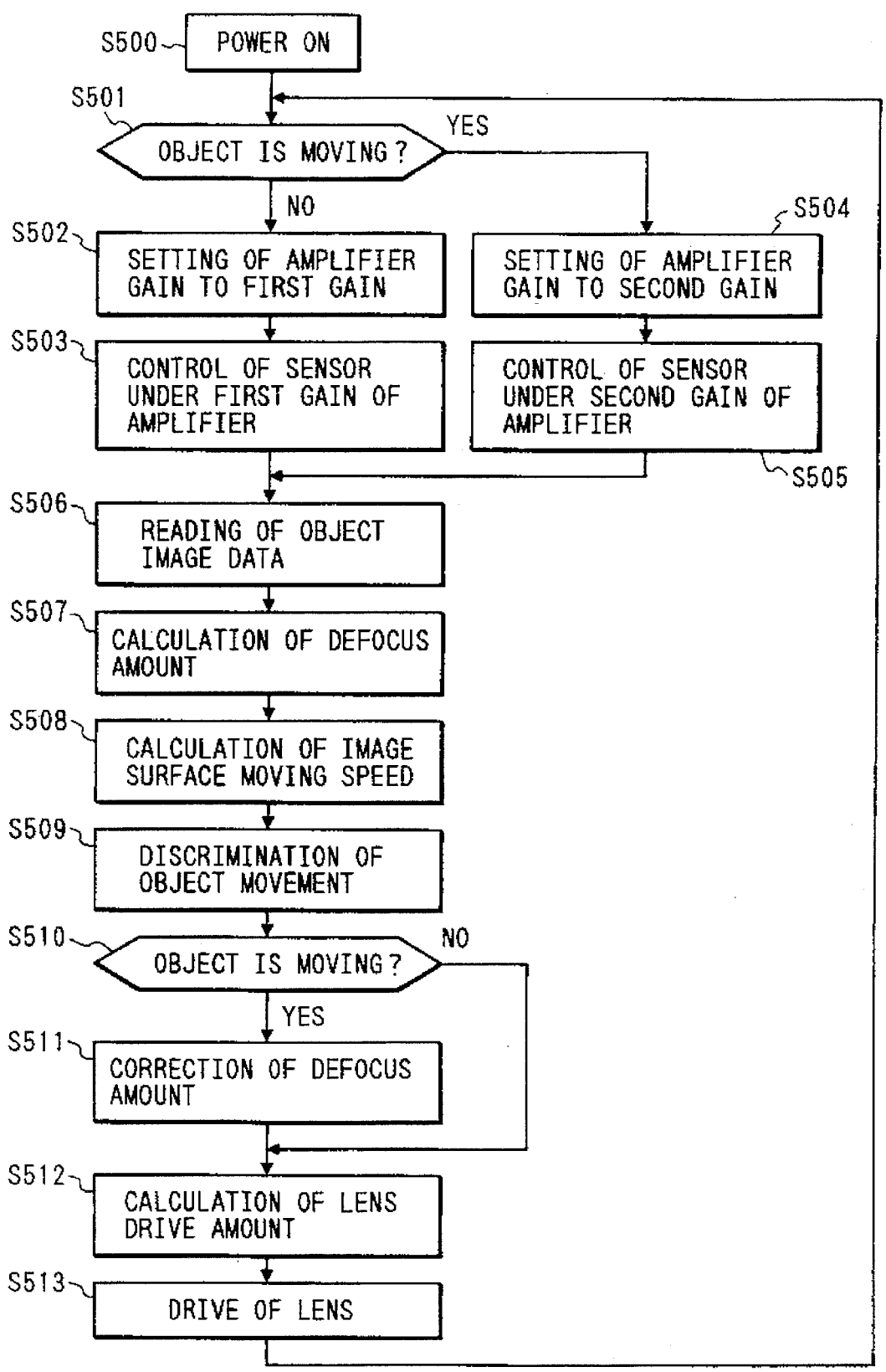
FIG. 30 is a flow chart showing an operation of the embodiment shown in FIG. 29.

In each of the above-mentioned processing sequences shown in FIGS. 27, 30, and 33, when object movement is detected, a defocus amount is corrected using equation (3), and thereafter, a lens drive amount is calculated. However, a lens drive amount may be calculated first based on the current defocus amount, and the calculated value may be corrected in accordance with the moving speed of an object image. That is, any other calculation orders may be adopted as long as the adjustment amount of the focal point position of the taking optical system is corrected when an object is moving.

As described above, in the camera of the first embodiment according to the third aspect of the present invention, when it is determined that an object is moving, the outputs from the second sensor having a high detection sensitivity of an object image are selected as the outputs from the light-receiving unit. Therefore, even in a low-luminance state, an object image can be quickly detected, and an image surface moving speed can be detected with high precision. Even when the object speed suddenly changes, the camera can follow an object without any response delay time.

In the camera of the second embodiment according to the third aspect of the present invention, when it is determined that an object is moving, the high object image detection sensitivity level of the light-receiving unit is selected. Therefore, even in a low-luminance state, an object image can be quickly detected, and an image surface moving speed can be detected with high precision. Even when the object speed suddenly changes, the camera can follow an object without any response delay time.

In the camera of the third embodiment according to the third aspect of the present invention, when it is determined that an object is moving, the outputs from only a specific sensor of the light-receiving element are selected as the outputs from the light-receiving portions, and the time required for calculation processing is shortened since the amount of data from the light-receiving means decreases. Therefore, an image surface moving speed can be detected with high precision, and even when the object speed suddenly changes, the camera can follow an object without any response delay time.

What is claimed is:

1. An autofocus camera comprising:

a taking optical system including an optical element movable in an optical axis direction to form an object image on a prospective focal plane;

a focus detection optical system;

a first sensor to receive the object image formed by said focus detection optical system;

a second sensor to receive the object image formed by said focus detection optical system and having a sensitivity higher than a sensitivity of said first sensor;

a focus detection calculation unit to calculate a defocus amount of an image surface of said taking optical system with respect to the prospective focal plane on the basis of an output from one of said first and second sensors;

a drive unit to drive said optical element in accordance with the defocus amount calculated by said focus detection calculation unit to attain an in-focus state of said taking optical system;

a continuous shooting unit to perform a continuous shooting operation; and a control unit to operate said second sensor during the continuous shooting operation by said continuous shooting unit.

2. A camera according to claim 1, wherein said first and second sensors are of a charge accumulation type, and a charge accumulation amount of said second sensor is larger than a charge accumulation amount of said first sensor when charge accumulation is performed for an object of a given luminance for a predetermined period of time.

3. A camera according to claim 1, wherein said first and second sensors have different pixel areas from one another.

4. A camera according to claim 2, wherein said first and second sensors have different pixel areas from one another.

5. A camera according to claim 1, wherein said focus detection optical system comprises:

a first focus detection optical system to form the object image as a first object image on said first sensor; and a second focus detection optical system, having optical characteristics different from optical characteristics of said first focus detection optical system, to form the object image as a second object image on said second sensor.

6. A camera according to claim 2, wherein said focus detection optical system comprises a first focus detection optical system for forming an object image on said first sensor, and a second focus detection optical system, having optical characteristics different from optical characteristics of said first focus detection optical system, for forming an object image on said second sensor.

7. A camera according to claim 1, wherein when an object luminance is low, said control unit preferentially operates said second sensor regardless of execution of the continuous shooting operation.

8. An autofocus camera comprising:

a taking optical system to form an object image of an object on a prospective focal plane;

a focus detection optical system arranged to detect a focusing state of said taking optical system;

a light-receiving unit to receive an object image formed by said focus detection optical system, said light-receiving unit including a first sensor and a second sensor having a higher detection sensitivity of the object image than a detection sensitivity of said first sensor;

a focus detection calculation unit to calculate a defocus amount of an image surface of said taking optical system with respect to the prospective focal plane on the basis of an output from said light-receiving unit;

an object movement discrimination unit to discriminate on the basis of a plurality of defocus amounts time-serially calculated by said focus detection calculation means whether the object is moving;

a focusing control unit to adjust a focal point position of said taking optical system on the basis of the defocus amount, and to correct, when it is determined that the object is moving, an adjustment amount of the focal point position of said taking optical system so as to decrease a focusing error caused by movement of the object; and a light-receiving control unit to select, when said object movement discrimination unit determines that the object is moving, an output from said second sensor as an output from said light-receiving unit.

9. A camera according to claim 8, wherein each of said first and second sensors comprises a charge accumulation type sensor to accumulate a charge in accordance with a received light amount, and a charge accumulation amount of said second sensor is larger than a charge accumulation amount of said first sensor when the object image has a given luminance which is received for a predetermined period of time.

10. A camera according to claim 8, wherein said second sensor has a pixel area which is larger than a pixel area of said first sensor.

11. A camera according to claim 9, wherein said second sensor has a pixel area which is larger than a pixel area of said first sensor.

12. A camera according to claim 8, wherein:

said focus detection optical system comprises:
 a first focus detection optical system to form the object image as a first object image on said first sensor; and
 a second focus detection optical system to form the object image as a second object image on said second sensor; and said second sensor has a pixel area which is larger than a pixel area of said first sensor when said first and second sensors are formed on a single surface on an object space side of said first and second focus detection optical systems.

13. A camera according to claim 9, wherein:

said focus detection optical system comprises:
 a first focus detection optical system to form the object image as a first object image on said first sensor; and
 a second focus detection optical system to form the object image as a second object image on said second sensor; and said second sensor has a pixel area which is larger than pixel area of said first sensor when said first and second sensors are formed on a single surface on an object space side of said first and second focus detection optical systems.

14. A camera according to claim 8, wherein said light-receiving control unit selects an output from said second sensor as an output from said light-receiving unit when said object movement discrimination unit determines that the object is moving, and a luminance of the object image is not more than a predetermined value.

15. A camera according to claim 9, wherein said light-receiving control unit selects an output from said second sensor as an output from said light-receiving unit when said object movement discrimination unit determines that the object is moving, and a luminance of the object image is not more than a predetermined value.

16. An autofocus camera comprising:

a taking optical system to form an object image on a prospective focal plane;

a focus detection optical system to detect focusing states on a plurality of focus detection areas set in a taking field defined by said taking optical system;

a light-receiving unit comprising a plurality of sensors to receive a respective plurality of object images formed by said focus detection optical system in respective units of said plurality of focus detection areas;

a focus detection calculation unit to calculate a defocus amount of an image surface of said taking optical system with respect to the prospective focal plane on the basis of an output from said light-receiving unit;

an object movement discrimination unit to discriminate on the basis of a plurality of defocus amounts time-serially calculated by said focus detection calculation unit whether the object is moving;

a focusing control unit to adjust a focal point position of said taking optical system on the basis of the defocus amount, and to correct, when it is determined that the object is moving, an adjustment amount of the focal point position of said taking optical system so as to decrease a focusing error caused by movement of the object; and a focus detection area selection unit to select, when said object movement discrimination unit determines that the object is moving, an output from only the sensor, corresponding to a specific focus detection area, of said plurality of sensors of said light-receiving unit as the output from said light-receiving unit.

17. A camera according to claim 16, wherein each of said plurality of sensors comprises a charge accumulation type sensor to accumulate a charge in accordance with a received light amount.

18. A camera according to claim 16, wherein said object movement discrimination unit determines the focus detection area in which the object is moving and said focus detection area selection unit selects, as the output from said light-receiving unit, the output from the sensor corresponding to the focus detection area from which said object movement discrimination unit determines that the object is moving.

19. A camera according to claim 17, wherein said focus detection area selection unit selects, as the output from said light-receiving unit, the output from the sensor corresponding to the focus detection area from which said object movement discrimination unit determines that the object is moving.

20. A camera according to claim 16, wherein ones of the plurality of focus detection areas partially overlap each other and extend in different directions in the taking field defined by said taking optical system.

21. A camera according to claim 17, wherein ones of the plurality of focus detection areas partially overlap each other and extend in different directions in the taking field defined by said taking optical system.

22. A camera according to claim 20, wherein said focus detection area selection unit selects, as the output from said light-receiving unit, the output from the sensor corresponding to a high-luminance focus detection area of the plurality of focus detection areas.

23. A camera according to claim 21, wherein said focus detection area selection unit selects, as the output from said light-receiving unit, the output from the sensor corresponding to a high-luminance focus detection area of the plurality of focus detection areas.

24. A method of controlling an autofocus camera capable of performing a continuous shooting operation, comprising the steps of:

receiving an object image formed by a focus detection optical system by a first sensor;

receiving the object image formed by said focus detection optical system by a second sensor;

calculating a defocus amount of an image surface of a taking optical system with respect to a prospective focal plane on the basis of an output from one of said first and second sensors; and driving said taking optical system in accordance with the calculated defocus amount to achieve an in-focus state, wherein said second sensor is operated during the continuous shooting operation of the camera.

25. A method of controlling an autofocus camera, comprising the steps of:

receiving an object image of an object formed by a focus detection optical system by a light-receiving unit including a first sensor and a second sensor having a sensitivity higher than a sensitivity of said first sensor;

calculating a defocus amount of an image surface of a taking optical system with respect to a prospective focal plane on the basis of an output from said light-receiving unit;

discriminating whether the object is moving based on a plurality of time-serially calculated defocus amounts; and adjusting a focal point position of said taking optical system on the basis of the defocus amount, and when it is determined that the object is moving, correcting an adjustment amount of the focal point position of said taking optical system so as to decrease a focusing error caused by movement of the object, wherein when it is determined that the object is moving, the output from said second sensor is selected as an output from said light-receiving unit.

26. A method of controlling an autofocus camera, comprising the steps of:

receiving object images of an object formed by light beams passing through a respective plurality of focus detection areas set in a taking field by sensors, and outputting respective outputs corresponding to the object images;

calculating a defocus amount of an image surface of a taking optical system with respect to a prospective focal plane on the basis of the outputs;

discriminating whether the object is moving based on a plurality of time-serially calculated defocus amounts;

adjusting a focal point position of said taking optical system on the basis of the defocus amount, and when it is determined that the object is moving, correcting an adjustment amount of the focal point position of said taking optical system so as to decrease a focusing error caused by movement of the object; and selecting the output from only the sensor corresponding to a specific one of the plurality of focus detection areas so as to use the selected output in a defocus amount calculation when it is determined that the object is moving.

27. An autofocus camera comprising:

a taking optical system for forming an object image on a taking field set on a prospective focal plane;

a plurality of photoelectric conversion portions, arranged in correspondence with a plurality of focus detection areas respectively set at a center and at peripheries of the taking field, to convert light beams incident on the corresponding focus detection areas into electrical signals, and outputting the electrical signals;

a focus detection optical system for forming an object image by guiding a light beam passing through the focus detection optical areas to the corresponding photoelectric conversion portions;

a focus detection calculation unit to calculate a defocus amount of an imaging surface of said taking optical system with respect to the prospective focal plane on the basis of outputs from said plurality of photoelectric conversion portions;

a drive unit to drive said taking optical system in accordance with the defocus amount calculated by said focus detection calculation unit;

a continuous shooting unit to perform a continuous shooting operation; and a control unit to control, when the continuous shooting operation is performed by said continuous shooting unit, said focus detection calculation unit to calculate the defocus amount on the basis of an output from the photoelectric conversion portion corresponding to the focus detection area at the center of the taking field, and to control, when the continuous shooting operation is not performed, said focus detection calculation unit to calculate the defocus amount on the basis of the outputs from said photoelectric conversion portions corresponding to all of the focus detection areas.

28. An autofocus camera comprising:

a taking optical system for forming an object image on a taking field set on a prospective focal plane;

a plurality of photoelectric conversion portions, arranged in correspondence with a plurality of focus detection areas set in the taking field, to convert light beams incident on the corresponding focus detection areas into electrical signals, and outputting the electrical signals;

a focus detection optical system for forming an object image by guiding a light beam passing through the focus detection optical areas to the corresponding photoelectric conversion portions;

a focus detection calculation unit to calculate a defocus amount of an imaging surface of said taking optical system with respect to the prospective focal plane on the basis of outputs from said plurality of photoelectric conversion portions;

a drive unit to drive said taking optical system in accordance with the defocus amount calculated by said focus detection calculation unit;

a continuous shooting unit to perform a continuous shooting operation;

an orientation detection unit to detect an orientation of the camera; and a control unit to select one of the plurality of focus detection areas based upon the orientation of the camera and to control said focus detection calculation unit to calculate the defocus amount on the basis of an output from the photoelectric conversion portion corresponding to the selected one of the plurality of focus detection areas when the continuous shooting operation is performed by said continuous shooting unit, and to control, when the continuous shooting operation is not performed, said focus detection calculation unit to calculate the defocus amount on the basis of the outputs from said photoelectric conversion portions corresponding to all of the focus detection areas.

29. An autofocus camera comprising:

a taking optical system for forming an object image on a taking field set on a prospective focal plane;

a plurality of photoelectric conversion portions, arranged in correspondence with a plurality of focus detection areas set in the taking field, to convert light beams incident on the corresponding focus detection areas into electrical signals, and outputting the electrical signals;

a focus detection optical system for forming an object image by guiding a light beam passing through the focus detection optical areas to the corresponding photoelectric conversion portions;

a focus detection calculation unit to calculate a defocus amount of an imaging surface of said taking optical system with respect to the prospective focal plane on the basis of outputs from said plurality of photoelectric conversion portions;

a drive unit to drive said taking optical system in accordance with the defocus amount calculated by said focus detection calculation unit;

a continuous shooting unit to perform a continuous shooting operation;

a setting member for arbitrarily setting one of the plurality of focus detection areas subjected to focus detection in the continuous shooting operation;

a control unit to control, when the continuous shooting operation is performed by said continuous shooting unit, said focus detection calculation unit to calculate the defocus amount on the basis of an output from the photoelectric conversion portion corresponding to the one of the plurality of focus detection areas set by said setting member, and to control, when the continuous shooting operation is not performed, said focus detection calculation unit to calculate the defocus amount on the basis of the outputs from said photoelectric conversion portions corresponding to all of the focus detection areas.

* * * * *